(12) United States Patent
Yanagida

(10) Patent No.: US 11,588,404 B2
(45) Date of Patent: Feb. 21, 2023

(54) SEMICONDUCTOR DEVICE AND STEP-DOWN MULTI-PHASE DC/DC CONVERTER

(71) Applicant: Rohm Co., Ltd., Kyoto (JP)

(72) Inventor: Osamu Yanagida, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/346,407

(22) Filed: Jun. 14, 2021

(65) Prior Publication Data

US 2021/0408913 A1    Dec. 30, 2021

(30) Foreign Application Priority Data

Jun. 25, 2020  (JP) .............................. JP2020109334

(51) Int. Cl.
 *H02M 3/158*     (2006.01)
(52) U.S. Cl.
 CPC ................................ *H02M 3/1586* (2021.05)
(58) Field of Classification Search
 CPC ... H02M 3/158; H02M 3/1584; H02M 3/1586
 See application file for complete search history.

(56) References Cited

U.S. PATENT DOCUMENTS

| 6,515,460 | B1* | 2/2003 | Farrenkopf | ......... | H02M 3/1584 |
| | | | | | 323/272 |
| 10,284,095 | B1* | 5/2019 | Mednik | ............... | H02M 3/1584 |
| 2015/0188406 | A1 | 7/2015 | Nishi et al. | | |
| 2020/0021189 | A1* | 1/2020 | Li | ......................... | H02M 3/158 |

FOREIGN PATENT DOCUMENTS

JP         2015-128345         7/2015

* cited by examiner

*Primary Examiner* — Alex Torres-Rivera
(74) *Attorney, Agent, or Firm* — Fish & Richardson P.C.

(57) ABSTRACT

The disclosure relates to a semiconductor device and a step-down multi-phase DC/DC converter. A DC/DC converter having higher load response performance and efficiency is provided. The step-down multi-phase DC/DC converter includes multiple output-stage circuits, which generate multiple switch voltages in rectangular waves by means of switching an input voltage, and an output voltage is obtained by means of rectifying and smoothing the multiple switch voltages. An error voltage is generated on the basis of a feedback voltage corresponding to the output voltage and a reference voltage, multiple feedback pulsating voltages variant with the multiple switch voltages are generated on the basis of the feedback voltage, and an on timing sequence including multiple on timings is generated according to the generated voltages. The multiple output circuits are switch-driven sequentially according to the on timing sequence, so as to set phase differences for the switch-driving.

9 Claims, 11 Drawing Sheets

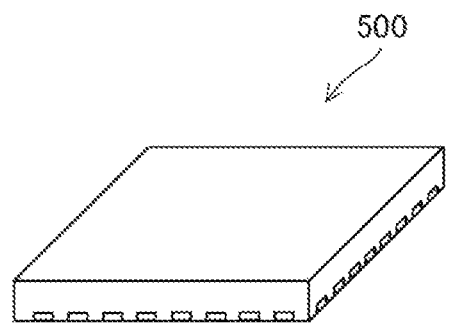
FIG.9
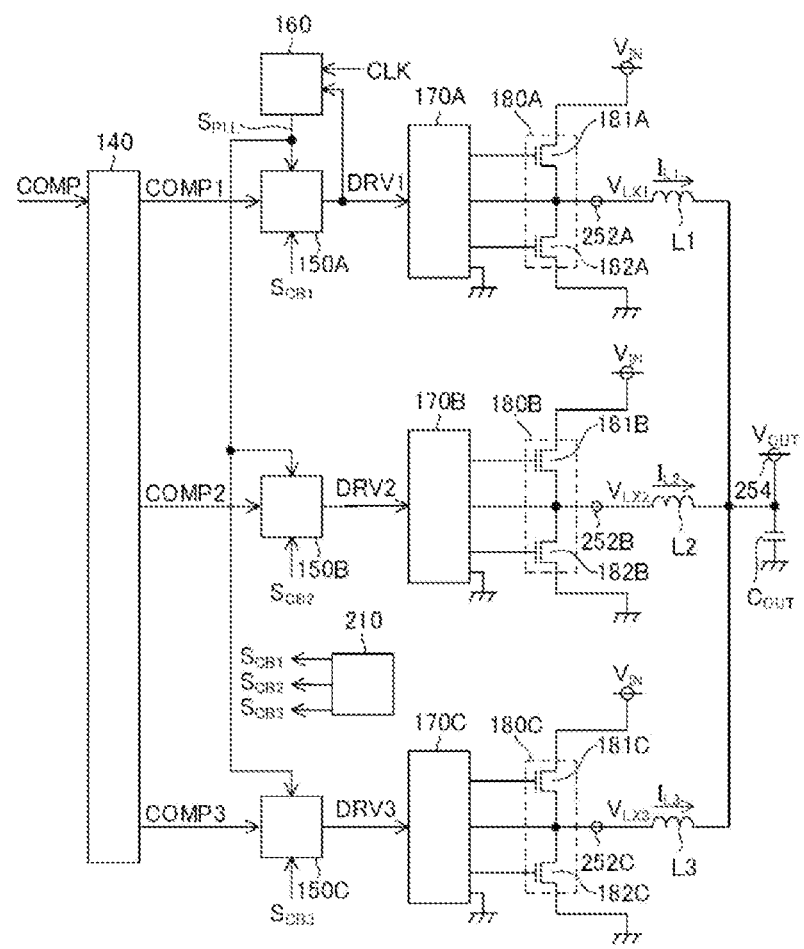
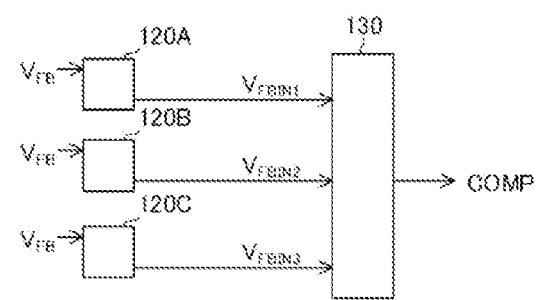
FIG.10

SEMICONDUCTOR DEVICE AND STEP-DOWN MULTI-PHASE DC/DC CONVERTER

BACKGROUND OF THE INVENTION

1. Field of the Invention

The disclosure relates to a semiconductor device and a step-down multi-phase direct-current-to-direct-current (DC/DC) converter.

2. Description of the Prior Art

In a step-down multi-phase direct-current-to-direct-current (DC/DC) converter serving as a step-down DC/DC converter, a plurality of output-stage circuits for switching an input voltage are provided, and a phase difference is configured for switching of the plurality of output-stage circuits, such that a stable output voltage is obtained by means of switch-driving the output-stage circuits.

[Prior Art Document]

PATENT PUBLICATION

[Patent document 1] Japan Patent Publication No. 2015-128345

SUMMARY

Problems to be Solved by the Invention

Various circuit configurations have been proposed as detailed structures of a step-down multi-phase DC/DC converter; however, characteristics of a power source (for example, load response performance or power efficiency) need to be further improved.

It is an object of the disclosure to provide a semiconductor device and a step-down multi-phase DC/DC converter that promote characteristics enhancement.

Technical Means for Solving the Problem

A semiconductor device of the disclosure is configured as below (first configuration), that is, a semiconductor device, applied to a step-down multi-phase DC/DC converter for stepping down an input voltage and generating an output voltage based on a plurality of switch voltages, includes: a plurality of output-stage circuits, generating the plurality of switch voltages by a plurality of switch terminals by means of switching the input voltage; an error voltage generator, generating an error voltage, the error voltage corresponding to a difference between a voltage proportional to a feedback voltage of the output voltage and a predetermined reference voltage; a feedback pulsating voltage generator, generating, by using the feedback as a reference, a plurality of feedback pulsating voltages variant with the plurality of switch voltages; an on timing sequence generator, generating an on timing sequence including a plurality of on timings according to the error voltage and the plurality of feedback pulsating voltages; and a switch control portion, sequentially switch-driving the plurality of output-stage circuits according to the on timing sequence, so as to assign a phase difference to the switch-driving of the plurality of output-stage circuits.

The semiconductor device of the first configuration may also be configured as below (second configuration), that is, a plurality of output transistors are provided in the plurality of output-stage circuits by means of disposing an output transistor between an application terminal of the input voltage and a corresponding switch terminal in each of the output-stage circuits; and the switch control portion includes an on-time setting portion that sets an on time of each of the output transistors, and switch-drives the plurality of output-stage circuits according to a setting configuration thereof and the on timing sequence.

The semiconductor device of the second configuration may also be configured as below (third configuration), that is, the on timing sequence generator generates the on timing sequence by setting a moment as the on timing whenever a high-low relationship between the error voltage and an average voltage of the plurality of feedback pulsating voltages changes from a first relationship to a second relationship; and the switch control portion repeats an operation of sequentially turning on the plurality of output transistors at the plurality of consecutive on timings included in the on timing sequence.

The semiconductor device of the second or third configuration may also be configured as below (fourth configuration), that is, the on-time setting portion generates a plurality of driving control signals specifying an on-period and an off-period of the plurality of output transistors according to the setting configuration of the on time of each of the output transistors and the on timing sequence, the switch control portion includes a switching driving portion that turns on/off the plurality of output transistors according to the plurality of driving control signals, and the on-time setting portion sets, using a phase-locked loop (PLL) circuit, the on time of each of the output transistors such that a frequency of the plurality of driving control signals corresponding to a switching frequency of the plurality of output transistors matches or approximates a predetermined reference frequency.

The semiconductor device of the second to fourth configurations may also be configured as below (fifth configuration), that is, the switch control portion includes: a current detection portion, detecting a plurality of target currents flowing through the plurality of switch terminals; and a current balance signal generator, generating a current balance signal corresponding to a magnitude relationship of the plurality of target currents according to a detection result of the current detection portion; and the on-time setting portion adjusts the on time of each of the output transistors according to the current balance signal to reduce a difference between the plurality of target currents.

The semiconductor device of the fifth configuration may also be configured as below (sixth configuration), that is, the plurality of target currents include a first target current and a second target current, the plurality of output transistors include a first output transistor connected to the switch terminal at which the first target current flows and a second output transistor connected to the switch terminal at which the second target current flows; the on-time setting portion decreases and corrects the on time of the first output transistor according to the current balance signal and increases and corrects the on time of the second output transistor when the first target current is greater than the second target current, and increases and corrects the on time of the first output transistor according to the current balance signal and decreases and corrects the on time of the second output transistor when the first target current is less than the second target current.

Another semiconductor device of the disclosure is configured as below (seventh configuration), that is, a semiconductor device, applied to a step-down multi-phase DC/DC converter for stepping down an input voltage and generating an output voltage based on a plurality of switch voltages, includes: a plurality of output-stage circuits, generating the plurality of switch voltages by a plurality of switch terminals by means of switching the input voltage; and a switch control portion, switch-driving the plurality of output-stage circuits in a state where switch-driving of the plurality of output-stage circuits are provided with a phase difference, in which a plurality of output transistors are provided in the plurality of output-stage circuits by means of disposing an output transistor between an application terminal of the input voltage and a corresponding switch terminal in each of the output-stage circuits; and the switch control portion includes: an on-time setting portion, setting an on time of each of the output transistors; a current detection portion, detecting a plurality of target currents flowing through the plurality of switch terminals; and a current balance signal generator, generating a current balance signal corresponding to a magnitude relationship of the plurality of target currents, in which the on-time setting portion adjusts the on time of each of the output transistors according to the current balance signal to reduce a difference between the plurality of target currents.

The semiconductor device of the seventh configuration may also be configured as below (eighth configuration), that is, the plurality of target currents include a first target current and a second target current, the plurality of output transistors include a first output transistor connected to the switch terminal at which the first target current flows and a second output transistor connected to the switch terminal at which the second target current flows; the on-time setting portion decreases and corrects the on time of the first output transistor according to the current balance signal and increases and corrects the on time of the second output transistor when the first target current is greater than the second target current, and increases and corrects the on time of the first output transistor according to the current balance signal and decreases and corrects the on time of the second output transistor when the first target current is less than the second target current.

A step-down multi-phase DC/DC converter of the disclosure is configured as below (ninth configuration), that is, the step-down multi-phase DC/DC converter includes: the semiconductor device of any one of the first to eighth configurations; a plurality of coils, disposed between an output terminal to which the output voltage is applied and the plurality of switch terminals; and an output capacitors, disposed between the output terminal and the ground, in which the output voltage is generated at the output terminal by means of rectifying and smoothing the plurality of switch voltages by using the plurality of coils and the output capacitor.

Effects of the Invention

It is an object of the disclosure to provide a semiconductor device and a step-down multi-phase DC/DC converter that promote characteristics enhancement.

BRIEF DESCRIPTION OF THE DRAWINGS

FIG. 9 is a three-dimensional diagram of the appearance of a semiconductor device according to a third embodiment of the disclosure;

FIG. 10 is a brief partial structural diagram of a step-down three-phase DC/DC converter according to a fifth embodiment of the disclosure;

DETAILED DESCRIPTION OF THE INVENTION

Figure 1:
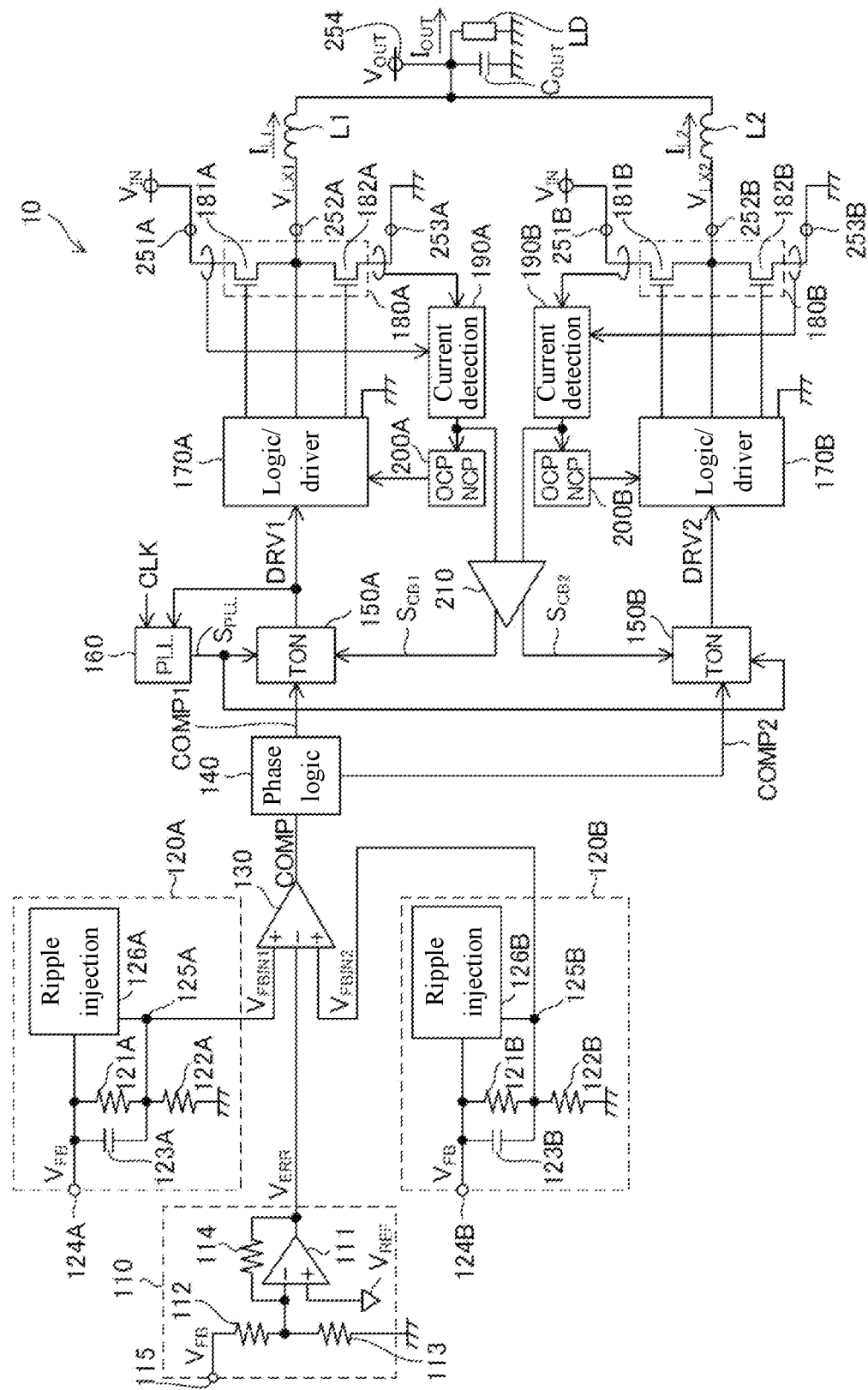
FIG. 1 is an overall structural diagram of a direct-current-to-direct-current (DC/DC) converter according to a first embodiment of the disclosure.

Details of examples of the embodiments of the present invention are given with the accompanying drawings below. In the reference drawings, the same parts are denoted by the same numerals or symbols, and repeated description related to the same parts are in principle omitted. Further, to keep the description of the application simple, the names of corresponding information, signals, physical quantities, elements or parts corresponding to the numerals or symbols are sometimes omitted by denoting numerals or symbols of reference information, signals, physical quantities, elements or parts. For example, a current balance signal generator denoted by the numeral "210" below is sometimes referred to as a current balance signal generator 210 and is sometimes simply referred to as a generator 210, both of which mean the same part.

Some terms and definitions used in the description of the embodiments of the disclosure are first illustrated below. The so-called "ground" refers to a reference conductive portion having a reference voltage of 0 V potential or the 0 V potential itself. The reference conductive portion is a conductor formed of such as metal. The 0 V potential is sometimes referred to as a ground potential. In the embodiments of the disclosure, a voltage expressed without a specifically set reference represents a potential from a ground aspect.

For any concerned signal or voltage, the level refers to the level of a potential, and a high level has a potential higher than that of a low potential. For any concerned signal or voltage, the signal or voltage at a high level means that the level of the signal or voltage is at a high level, and the signal or voltage at a low level means that the level of the signal or voltage is at a low level. The level regarding a signal is sometimes expressed as a signal level, and the level regarding a voltage is sometimes expressed as a voltage level. For any concerned signal, an inverted signal of the signal is at a low level when the signal is at a high level, and an inverted signal of the signal is at a high level when the signal is at a low level.

For any concerned signal or voltage, switching from a low level to a high level is referred to as a rising edge, and a timing of switching from a low level to a high level is referred to as a rising edge timing. Similarly, for any concerned signal or voltage, switching from a high level to a low level is referred to as a falling edge, and a timing of switching from a high level to a low level is referred to as a falling edge timing.

For any transistor formed as a field-effect transistor (FET) including a metal-oxide-semiconductor field-effect transistor (MOSFET), an on state refers to a state of conduction between the drain and the source of the transistor, and an off state refers to a state of non-conduction (a state of disconnection) between the drain and the source of the transistor. The same applies to non-FET transistors. Unless otherwise specified, a MOSFET is interpreted as an enhanced MOSFET. MOSFET is an abbreviation of metal-oxide-semiconductor field-effect transistor.

In the description below, for any transistor, the on state and the off state may also be expressed only as on and off. For any transistor, switching from a state of disconnection to a state of conduction is expressed as turning on, and switching from a state of conduction to a state of disconnection is expressed as turning off. The timing of the occurrence of conduction is referred to as a turn-on timing, and a timing of the occurrence of disconnection is referred to as a turn-off timing. For any transistor, a period in which the transistor is changed to a state of conduction is referred to an on-period, and a period in which the transistor is changed to a state of disconnection is referred to as an off-period.

For any signal of which the signal level adopts a high level or a low level, a period in which the level of the signal is changed from a high level is referred to as a high-level period, and a period in which the level of the signal is changed to a low level is referred to as a low-level period. The same applies to any voltage of which the voltage level adopts a high level or a low level.

<<Introduction>>

In a step-down direct-current-to-direct-current (DC/DC) converter, an input voltage is switched in an output-stage circuit including a serial circuit of an output transistor and a synchronous rectifier transistor, and a rectangular voltage obtained by the switching is rectified and smoothed using coils and a capacitor to accordingly obtain an output voltage. In such step-down DC/DC converter, high load response performance and miniaturization are often demanded to a large extent, depending different purposes.

In known techniques, a constant on-time control method is used as a control method suitable for high load response performance. In the constant on-time control method, the on time of an output transistor is set as fixed and the off-time of the output transistor is adjusted when the output transistor is switch-driven, so as stabilize the output voltage.

On the other hand, in uses requiring a large current flowing in coils, in case of one coil, the size of the coil needs to be increased due to factors such as ratings and heating. When the size of the coil is increased, the size of the DC/DC converter and the size of a device including the DC/DC converter are also increased (that is, miniaturization becomes difficult). A multi-phase driving method is one driving method that helps miniaturization.

Figure 13:
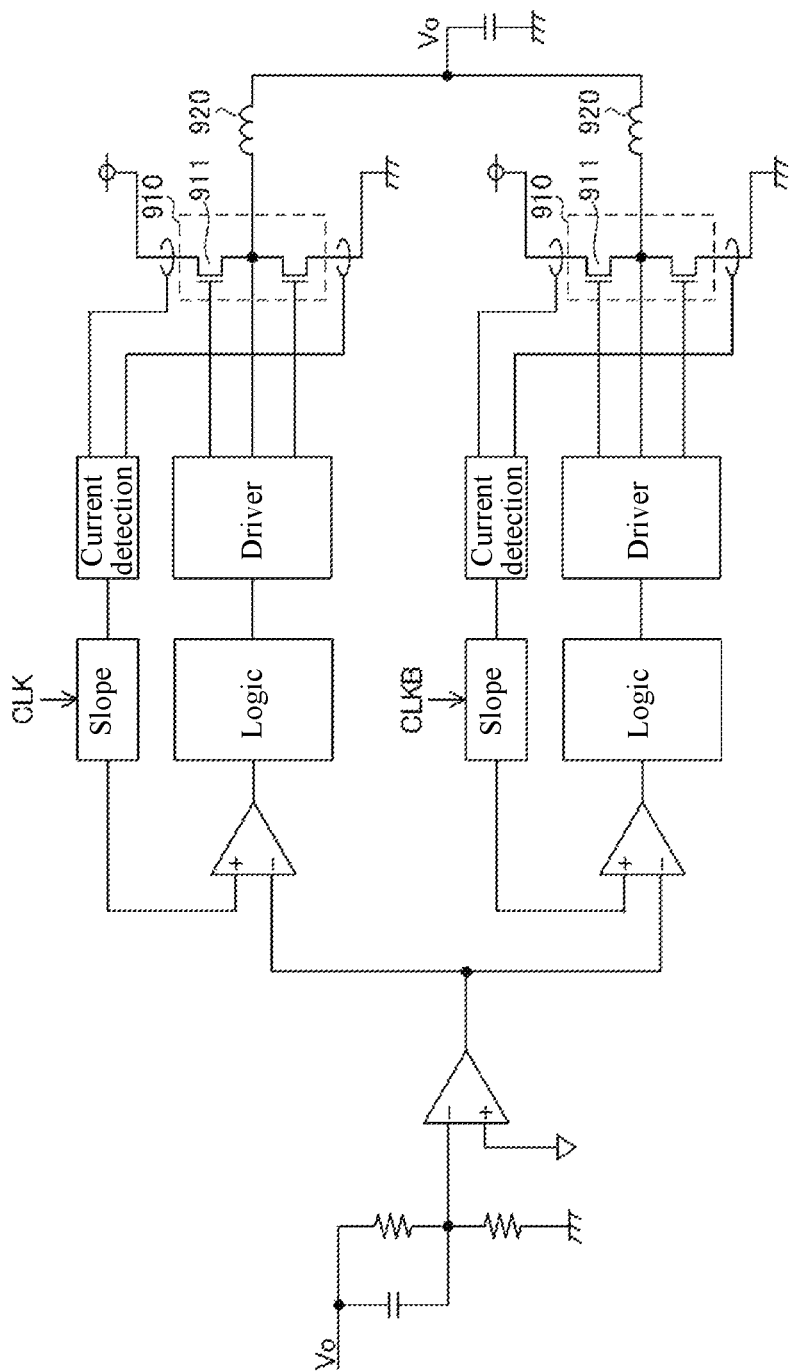
FIG. 13 is a structural diagram of a step-down DC/DC converter adopting multi-phase driving in a reference configuration.

In a step-down DC/DC converter adopting a multi-phase driving method, as shown in FIG. 13, multiple output-stage circuits 910 including output transistors 911 for multiple channels are provided, in which the multiple output-stage circuits 910 are switch-driven in a state of phase-shift. In the structure in FIG. 13, a phase difference of 180° is configured since output-stage circuits 910 of two phases are provided, and the two output-stage circuits 910 are switch-driven to generate an output voltage Vo at a connecting node between first and second coils 920. The output current (load current) flows in a distributed manner at the two coils 920, and so the size of the current flowing in each coil is reduced. Thus, the size of the coil may then be reduced. Moreover, output ripples may be effectively reduced.

However, in the structure in FIG. 13, the so-called current mode control method is used, and has lower load response performance compared to the constant on-time control method. Thus, in a use demanding high load response performance, a step-down DC/DC converter adopting the constant on-time control method is generally selected. Moreover, as the structure shown in FIG. 13, the control of switching an output transistor (the transistor 911 in FIG. 13) using a fixed clock is referred to as linear control, and the control of switching an output transistor using the constant on-time control method is referred to as non-linear control.

Assuming that the constant on-time control method or a similar control method can be combined with the multi-phase driving method, high load response performance and miniaturization can be achieved at the same time for optimization.

However, when multiple DC/DC converters using the constant on-time control method are simply connected in a parallel configuration for parallel driving, good characteristics cannot be obtained. In a simple a parallel configuration, each of the DC/DC converters independently turns on/off the output transistor thereof according to an output voltage, and so it may be assumed that the multiple output transistors are simultaneously turned on (that is to say, multi-phase driving is not implemented). In order to implement multi-phase driving, a suitable technique (to be referred to as a phase difference ensuring technique below for the sake of simplicity) is needed for ensuring a phase difference of switch-driving of output-stage circuits.

In addition, during multi-phase driving, if the amounts of currents flowing in multiple coils (for example, one between the currents flowing in the two coils 920 in the structure in FIG. 13 is larger than the other) are unequal, the efficiency of the DC/DC converter is lowered. Thus, a technique (to be referred to as a current balance technique below) rendering equal amounts of currents flowing in multiple coils is also desired.

First Embodiment

The first embodiment of the disclosure is described below. FIG. 1 shows an overall structure of a direct-current-to-direct-current (DC/DC) converter according to the first embodiment of the disclosure. A DC/DC converter 10 is a step-down multi-phase DC/DC converter that simultaneously achieves the phase difference ensuring technique and the current balance technique, and generates an output voltage $V_{OUT}$ by means of stepping down an input voltage $V_{IN}$.

The input voltage $V_{IN}$ is a positive DC voltage, and has, for example, a voltage value ranging from 4.0 V to 18.0 V. The output voltage $V_{OUT}$ is lower than the input voltage $V_{IN}$, and has a stable positive DC voltage value, except for in the transition state of the DC/DC converter 10. A target value (a value of a target voltage $V_{TG}$ to be described shortly) of the output voltage $V_{OUT}$ has, for example, a voltage value ranging from 0.6 V to 3.4 V.

The DC/DC converter 10 includes the error voltage generator 110, pulse generators 120A and 120B, a pulse width modulation (PWM) comparator 130, a phase control logic 140, on-time (TON) setting portions 150A and 150B, a phase-locked loop (PLL) circuit 160, output-stage driving portions 170A and 170B, output-stage circuits 180A and 180B, current sensors 190A and 190B, protection circuits 200A and 200B, a current balance signal output portion 210, coils L1 and L2, and an output capacitor $C_{OUT}$. The DC/DC converter 10 further includes input terminals 251A and 251B, switch terminals 252A and 252B, ground terminals 253A and 253B, an output terminal 254, and also includes nodes to be described shortly. Moreover, one single input terminal may also serve as the input terminals 251A and 251B, and one single ground terminal may also serve as the ground terminals 253A and 253B.

The DC/DC converter 10 includes the output-stage circuits 180A and 180B of two phases, and switch-drives the output-stage circuits 180A and 180B using a phase difference of 180° (or a phase difference approximating 180°), so as to implement multi-phase driving. One between the two phases of multi-phase driving is referred to as a first phase, and the other is referred to as a second phase. Blocks 150A, 170A, 180A, 190A and 200A are a TON setting portion, an output-stage driving portion, an output-stage circuit, a current sensor and a protection circuit of the first stage, and blocks 150B, 170B, 180B, 190B and 200B are a TON setting portion, an output-stage driving portion, an output-stage circuit, a current sensor and a protection circuit of the second stage.

Characteristic operations of the DC/DC converter 10 are described in brief below. In the DC/DC converter 10, in order to ensure the 180° phase difference (or an approximately 180° phase difference), a signal COMP representing a turn-on timing is generated by the PWM comparator 130, and multiple turn-on timings in a turn-on timing sequence are alternately allocated to signals COMP1 and COMP2, to accordingly generate the signal COMP1 representing a turn-on timing of the first-phase output transistor (181A) and the signal COMP2 representing the turn-on timing of the second-phase output transistor (181B) (referring to FIG. 2).

Moreover, on periods of the output transistors 181A and 181B are set (adjusted) using the PLL circuit 160, such that switch frequencies of the output-stage circuits 180A and 180B match or approximate a predetermined reference frequency $f_{CLK}$. When the DC/DC converter 10 is stable, the PLL circuit 160 is locked, the switch frequencies of the output-stage circuits 180A and 180B (frequencies of driving control signals DRV1 and DRV2) are substantially fixed at the reference frequency $f_{CLK}$, and the on periods of the output transistors (181A and 181B) of the individual phases are substantially fixed as the periods appropriate for a load current (equivalent to an output current $I_{OUT}$) at this point. That is to say, on-time control similar to the constant on-time control method is achieved. In addition, at this point, a first-phase coil current ($I_{L1}$) and a second-phases coil current ($I_{L2}$) are adjusted to be equal with the function of the current balance signal generator 210.

Figure 2:
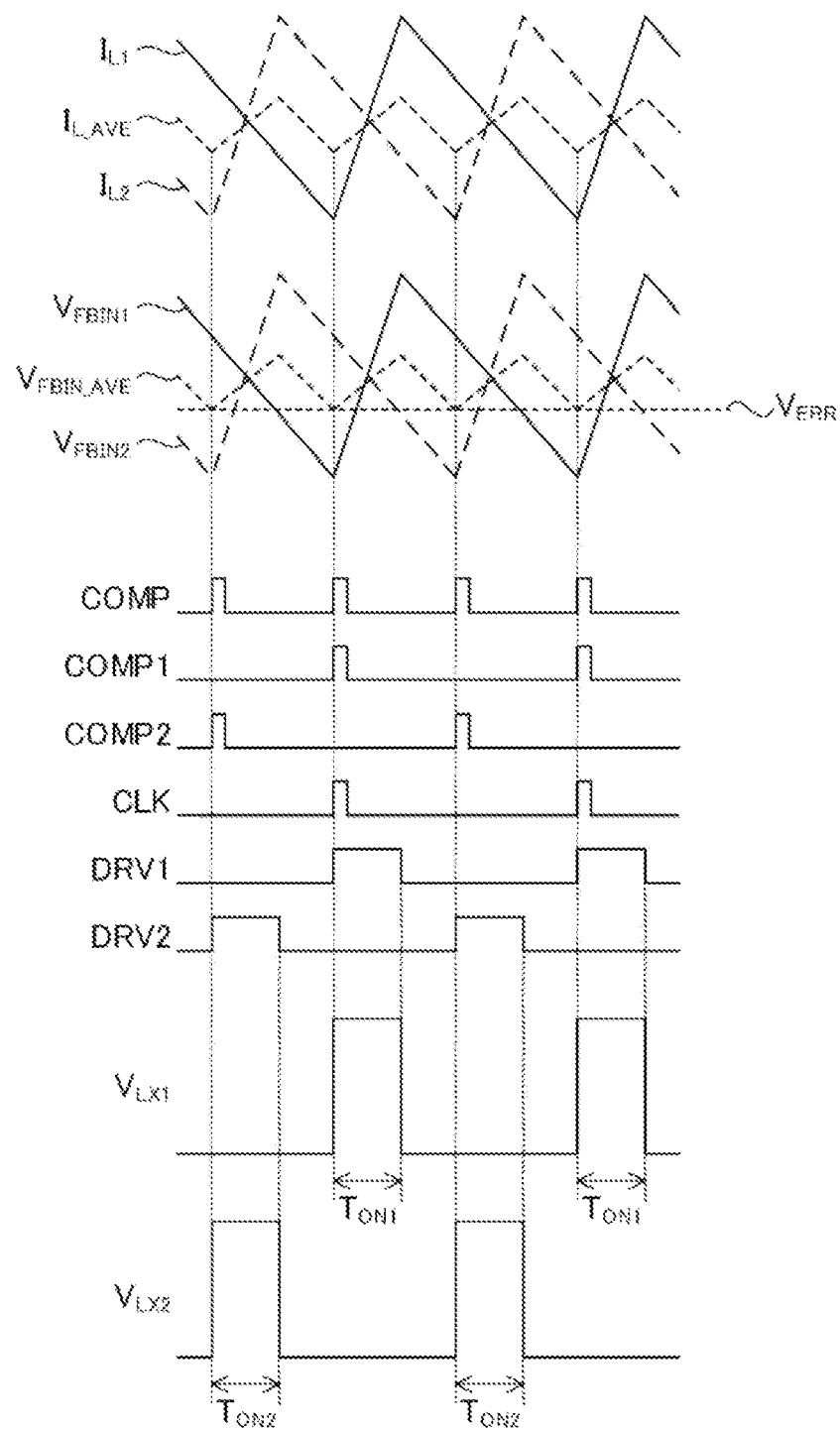
FIG. 2 is a waveform diagram of some currents, voltages and signals related to the DC/DC converter in FIG. 1.

Structures and operations of the components of the DC/DC converter 10 are described in detail below. FIG. 2 shows a waveform diagram of some currents, voltages and signals related to the DC/DC converter 10.

The output-stage circuits 180A and 180B and the peripheral circuits thereof are first described. The output-stage circuit 180A is a half-bridge circuit including transistors 181A and 182A. The transistors 181A and 182A are formed by N-channel MOSFETs. The drain of the transistor 181A is connected to the input terminal 251A, and the source of the transistor 182A is connected to the ground terminal 253A. The source of the transistor 181A and the drain of the transistor 182A are commonly connected to the switch terminal 252A. The switch terminal 252A is connected to one end of the coil L1, and the other end of the coil L1 is connected to the output terminal 254. The output-stage circuit 180B is a half-bridge circuit including transistors 181B and 182B. The transistors 181B and 182B are formed by N-channel MOSFETs. The drain of the transistor 181B is connected to the input terminal 251B, and the source of the transistor 182B is connected to the ground terminal 253B. The source of the transistor 181B and the drain of the transistor 182B are commonly connected to the switch terminal 252B. The switch terminal 252B is connected to one end of the coil L2, and the other end of the coil L2 is connected to the output terminal 254. The input terminals 251A and 251B are connected to an application terminal (a terminal applied with the input voltage $V_{IN}$) of the input voltage $V_{IN}$, and receives the input voltage $V_{IN}$. The ground terminals 253A and 253B are connected to the ground. An output capacitor $C_{OUT}$ is provided between the output terminal 254 and the ground, and the output voltage $V_{OUT}$ is applied to the output terminal 254.

A load LD is connected in parallel to the output capacitor $C_{OUT}$, and the load LD is driven by the output voltage $V_{OUT}$. A current supplied from the output terminal 254 to the load LD is referred to as an output current or a load current, and is denoted as "$I_{OUT}$".

In the first phase, the transistor 181A functions as an output transistor, and the transistor 182A functions as a synchronous rectifier transistor. Thus, the transistors 181A and 182A are sometimes referred to as the output transistor 181A and the synchronous rectifier transistor 182A, respectively. Further, the voltage applied to the switch terminal 252A is referred to as a switch voltage $V_{LX1}$. Moreover, it is considered herein that on-resistances of the transistors 181A and 182A are sufficiently small.

The state of the output-stage circuit 180A is any one of an outputting high level state, an outputting low level state and a Hi-Z state. When the output-stage circuit 180A is in the outputting high level state, the transistor 181A is in a on state (on) and the transistor 182A is in an off state (off), and a voltage substantially the same as the input voltage $V_{IN}$ is expressed as the switch voltage $V_{LX1}$. When the output-stage circuit 180A is in the outputting low level state, the transistor 181A is off and the transistor 182A is on, and a voltage substantially the ground (i.e., 0V voltage) is expressed as the switch voltage $V_{LX1}$. When the output-stage circuit 180A is in the Hi-Z state, both the transistors 181A and 182A are off.

By alternately turning on and off the transistors 181A and 182A in the output-stage circuit 180A, the input voltage $V_{IN}$ is switched and the switch voltage $V_{LX1}$ becomes a voltage in rectangular waves (referring to FIG. 2). The switch frequency of the output-stage circuit 180A is denoted as "$f_{SW1}$" (in other words, the switch frequency of the output transistor 181A). The switch frequency $f_{SW1}$ and the frequency of the switch voltage $V_{LX1}$ are equal to the frequency of the driving control signal DRV1 to be described shortly. When the output-stage circuit 180A is in the outputting high level state, electrical power based on the input voltage $V_{IN}$ is provided from the application terminal of the input voltage $V_{IN}$ through the output transistor 181A to the output terminal 254. Thus, the period in which the output-stage circuit 180A is in the outputting high level state in each cycle of the switching of the output-stage circuit 180A (that is, the period in which the output transistor 181A is on) is referred to as a turn-on time of the first phase or simply an on time, and is denoted as "$T_{ON1}$".

In the second phase, the transistor 181B functions as an output transistor, and the transistor 182B functions as a synchronous rectifier transistor. Thus, the transistors 181B and 182B are sometimes referred to as the output transistor 181B and the synchronous rectifier transistor 182B, respectively. Further, the voltage applied to the switch terminal 252B is referred to as a switch voltage $V_{LX2}$. Moreover, it is considered herein that on-resistances of the transistors 181B and 182B are sufficiently small.

The state of the output-stage circuit 180B is any one of an outputting high level state, an outputting low level state and a Hi-Z state. When the output-stage circuit 180B is in the outputting high level state, the transistor 181B is on and the transistor 182B is off, and a voltage substantially the same as the input voltage $V_{IN}$ is expressed as the switch voltage $V_{LX2}$. When the output-stage circuit 180B is in the outputting low level state, the transistor 181B is off and the transistor 182B is on, and a voltage substantially the ground (i.e., 0V voltage) is expressed as the switch voltage $V_{LX2}$. When the output-stage circuit 180B is in the Hi-Z state, both the transistors 181B and 182B are off.

By alternately turning on and off the transistors 181B and 182B in the output-stage circuit 180A, the input voltage $V_{IN}$ is switched and the switch voltage $V_{LX2}$ becomes a voltage in rectangular waves (referring to FIG. 2). The switch frequency of the output-stage circuit 180B is denoted as "$f_{SW2}$" (in other words, the switch frequency of the output transistor 181B). The switch frequency $f_{SW2}$ and the frequency of the switch voltage $V_{LX2}$ are equal to the frequency of the driving control signal DRV2 to be described shortly. When the output-stage circuit 180B is in the outputting high level state, electrical power based on the input voltage $V_{IN}$ is provided from the application terminal of the input voltage $V_{IN}$ through the output transistor 181B to the output terminal 254. Thus, the period in which the output-stage circuit 180B is in the outputting high level state in each cycle of the switching of the output-stage circuit 180B (that is, the period in which the output transistor 181B is on) is referred to as a turn-on time of the second phase or simply an on time, and is denoted as "$T_{ON2}$".

The coils L1 and L2 and the output capacitor $C_{OUT}$ form a rectifying and smoothing circuit. The switch voltages $V_{LX1}$ and $V_{LX2}$ in rectangular waves appearing at the switch terminals 252A and 252B are rectified and smoothed by the rectifying and smoothing circuit to generate the output voltage $V_{OUT}$. Further, the current flowing in the coil L1 and the current flowing in the coil L2 are respectively referred to as a coil current $I_{L1}$ and a coil current $I_{L2}$. The polarity of the coil current $I_{L1}$ from the switch terminal 252A to the output terminal 254 is positive, and the polarity of the coil current $I_{L2}$ from the switch terminal 252B to the output terminal 254 is positive.

The structures and operations of other circuits of the front-end circuit including the output-stage circuits 180A and 180B are described below. The error voltage generator 110 includes an error amplifier 111, resistors 112 and 113 serving as voltage dividing resistors, a resistor 114 serving as a feedback resistor, and a node 115. The node 115 is equivalent to a feedback input terminal, and a feedback voltage $V_{FB}$ is applied to the node 115. The feedback voltage $V_{FB}$ is a voltage proportional to the output voltage $V_{OUT}$. Further, the output voltage $V_{OUT}$ itself is the feedback voltage $V_{FB}$, and a divided voltage of the output voltage $V_{OUT}$ may also be the feedback voltage $V_{FB}$. The node 115 is connected to one terminal of the resistor 112, and the other terminal of the resistor 112 is connected to an inverting input terminal of the error amplifier 111 and is connected to the ground via the resistor 113. The predetermined reference voltage $V_{REF}$ is applied to a non-inverting input terminal of the error amplifier 111. The reference voltage $V_{REF}$ has a specific positive DC voltage value. The output terminal of the error amplifier 111 is connected to the inverting input terminal of the error amplifier 111 via the resistor 114. Thus, the error amplifier 111 and the resistors 112 to 114 form an inverting amplifier. An error voltage $V_{ERR}$ is outputted from the output terminal of the error amplifier 111, in which the error voltage $V_{ERR}$ corresponds to a difference between a voltage (the voltage applied to the inverting input terminal of the error amplifier 111) proportional to the feedback voltage $V_{FB}$ and the reference voltage $V_{REF}$.

The pulse generator 120A includes resistors 121A and 122A, a capacitor 123A, and nodes 124A and 125A, and also includes a ripple injecting portion 126A. The node 124A is connected to the node 115, and so the feedback voltage $V_{FB}$ is also applied to the node 124A. One terminal of the resistor 121A and one terminal of the capacitor 123A are commonly connected to the node 124A, and the other terminal of the resistor 121A and the other terminal of the capacitor 123A are commonly connected to the node 125A. The node 125A is connected to the ground via the resistor 122A.

A divided voltage of the feedback voltage $V_{FB}$ is generated at the node 125A using the function of the resistors 121A and 122A. The ripple injecting portion 126A is connected to the node 124A and the node 125A, and ripples are injected to the voltage (the divided voltage of the feedback voltage $V_{FB}$) generated at the node 125A by the function of the resistors 121A and 122A, to accordingly generate a pulsating voltage at the node 125A. The pulsating voltage generated at the node 125A is referred to as a feedback pulsating voltage $V_{FBIN1}$. The feedback pulsating voltage $V_{FBIN1}$ is a voltage variant with the switch voltage $V_{LX1}$. That is to say, the feedback pulsating voltage $V_{FBIN1}$ monotonically increases in a high-level period (that is, an on-period of the output transistor 181A) of the switch voltage $V_{LX1}$, and monotonically decreases in a low-level period (that is, an off-period of the output transistor 181A) of the switch voltage $V_{LX1}$. Thus, the feedback pulsating voltage $V_{FBIN1}$ has a waveform similar to the waveform of the coil current $I_{L1}$ (referring to FIG. 2). Ripples of the ripple injecting portion 126A may be generated according to the driving control signal DRV1 or the switch voltage $V_{LX1}$ to be described shortly.

The pulse generator 120B includes resistors 121B and 122B, a capacitor 123B, and nodes 124B and 125B, and also includes a ripple injecting portion 126B. The node 124B is connected to the node 115, and so the feedback voltage $V_{FB}$ is also applied to the node 124B. One terminal of the resistors 121B and one terminal of the capacitor 123B are commonly connected to the node 124B, and the other terminal of the resistor 121B and the other terminal of the capacitor 123B are commonly connected to the node 125B. The node 125B is connected to the ground via the resistor 122B.

A divided voltage of the feedback voltage $V_{FB}$ is generated at the node 125B using the function of the resistors 121B and 122B. The ripple injecting portion 126B is connected to the node 124B and the node 125B, and ripples are injected to the voltage (the divided voltage of the feedback voltage $V_{FB}$) generated at the node 125B by the function of the resistors 121B and 122B, to accordingly generate a pulsating voltage at the node 125B. The pulsating voltage generated at the node 125B is referred to as a feedback pulsating voltage $V_{FBIN2}$. The feedback pulsating voltage $V_{FBIN2}$ is a voltage variant with the switch voltage $V_{LX2}$. That is to say, the feedback pulsating voltage $V_{FBIN2}$ monotonically increases in a high-level period (that is, an on-period of the output transistor 181B) of the switch voltage $V_{LX2}$, and monotonically decreases in a low-level period (that is, an off-period of the output transistor 181B) of the switch voltage $V_{LX2}$. Thus, the feedback pulsating voltage $V_{FBIN2}$ has a waveform similar to the waveform of the coil current $I_{L2}$ (referring to FIG. 2). Ripples of the ripple injecting portion 126B may be generated according to the driving control signal DRV2 or the switch voltage $V_{LX2}$ to be described shortly.

Moreover, a voltage dividing ratio of the feedback voltage $V_{FB}$ generated by the resistors 121A and 122A of the pulse generator 120A (that is, the ratio of resistance values of the resistors 121A and 122A) coincides with a voltage dividing ratio of the feedback voltage $V_{FB}$ generated by the resistors 121B and 122B of the pulse generator 120B (that is, the ratio of resistance values of the resistors 121B and 122B). Thus, the DC component value of the feedback pulsating voltage $V_{FBIN1}$ is equal to the DC component value of the feedback pulsating voltage $V_{FBIN2}$.

The PWM comparator 130 includes first and second non-inverting input terminals, an inverting input terminal and an output terminal. In the PWM comparator 130, the feedback pulsating voltages $V_{FBIN1}$ and $V_{FBIN2}$ are respectively inputted to the first and second non-inverting input terminals, and the error voltage $V_{ERR}$ is inputted to the inverting input terminal. The PWM comparator 130 is built in with first and second differential amplifiers; the first differential amplifier generates a first difference signal corresponding to the difference ($V_{FBIN1}-V_{ERR}$) between the feedback pulsating voltage $F_{BIN1}$ and the error voltage $V_{ERR}$, and the second differential amplifier generates a second difference signal corresponding to the difference ($V_{FBIN2}-V_{ERR}$) between the feedback pulsating voltage $V_{FBIN2}$ and the error voltage $V_{ERR}$. Moreover, the PWM comparator 130 compares an average voltage of the feedback pulsating voltages $V_{FBIN1}$ and $V_{FBIN2}$ with the error voltage $V_{ERR}$ according to the sum of the two differences ($V_{FBIN1}+V_{FBIN2}-2\cdot V_{ERR}$), and outputs the comparison result in form of the signal COMP.

The average voltage of the feedback pulsating voltages $V_{FBIN1}$ and $V_{FBIN2}$ are denoted by "$V_{FBIN\_AVE}$". The average voltage $V_{FBIN\_AVE}$ expressed as "$V_{FBIN\_AVE}=(V_{FBIN1}+V_{FBIN2})/2$". As shown in FIG. 2, the comparator 130 keeps the signal COMP at a low level when "$V_{FBIN\_AVE}>V_{ERR}$" is true, and when switching is performed each time from "$V_{FBIN\_AVE}>V_{ERR}$" to "$V_{FBIN\_AVE}<V_{ERR}$", the signal COMP with set to a high level within a specific minute time starting from the switching timing as a starting point and is returned to a low level (that is to say, a one-shot pulse is generated). Further, in FIG. 2, the waveform of an average current $I_{L\_AVE}$ of the coil currents $I_{L1}$ and $I_{L2}$ is depicted, and the average voltage $V_{FBIN\_AVE}$ has a waveform similar to that of the average current $I_{L\_AVE}$ according to the correspondence between the feedback pulsating voltages $V_{FBIN1}$ and $V_{FBIN2}$ and the coil currents $I_{L1}$ and $I_{L2}$.

Each rising edge timing of the signal COMP represents the turn-on timing of any transistor between the output transistors 181A and 181B. That is to say, each rising edge timing of the signal COMP represents the timing at which the output transistor 181A is to be turned on (that is, the timing at which the state of the output-stage circuit 180A is to be switched to an outputting high level state), or the timing at which the output transistor 181B is to be turned on (that is, the timing at which the state of the output-stage circuit 180B is to be switched to an outputting high level state). Since a rising edge of the signal COMP is generated each time switching from "$V_{FBIN\_AVE}>V_{ERR}$" to "$V_{FBIN\_AVE}<V_{ERR}$" is performed, the signal COMP specifies the turn-on timing sequence. The turn-on timing sequence includes multiple turn-on timings arranged in a time sequence.

The phase control logic 140 generates the signals COMP1 and COMP2 from the signal COMP and outputs the signals COMP1 and COMP2. More specifically, the phase control logic 140 generates the signals COMP1 and COMP2 by alternately allocating multiple pulses representing multiple turn-on timings included in the signal COMP to the signals COMP1 and COMP2. To be even more specific, the operation below is performed. That is to say, the phase control logic 140 in principle keeps the levels of the signals COMP1 and COMP2 to a low level; the signal COMP1 also generates a rising edge in synchronization with the rising edge of the signal COMP when the signal COMP generates an (odd-number)$^{th}$ rising edge, and the signal COMP1 is set to a high level within a minute time and is then returned to a low level; the signal COMP2 also generates a rising edge in synchronization with the rising edge of the signal COMP when the signal COMP generates an (even-number)$^{th}$ rising edge, and the signal COMP2 is set to a high level within a minute time and is then returned to a low level.

The TON setting portion 150A generates the driving control signal DRV1 specifying the state of the output-stage circuit 180A according to the signal COMP1. The TON setting portion 150A has a function of setting the on time $T_{ON1}$, and specifies the turn-on timing of the output transistor 181A according to the driving control signal DRV1 (in other words, the timing of switching the output-stage circuit 180A from an outputting low level state to an outputting high level state), and the on-time of the output transistor 181A, that is, the on-time $T_{ON1}$. At this point, the TON setting portion 150A refers to a signal $S_{PLL}$ inputted from the PLL circuit 160 and a current balance signal $S_{CB1}$ inputted from the current balance signal generator 210, and generates the driving control signal DRV1 (with details to be given below).

The driving control signal DRV1 is a binary signal adopting a signal level that is a low level or a high level, and specifies an on-period and an off-period of the output transistor 181A using the driving control signal DRV1. Moreover, a high-level period of the driving control signal DRV1 corresponds to the on-period of the output transistor 181A (a period in which the output-stage circuit 180A is to be set to the outputting high level state), and a low-level period of the driving control signal DRV1 corresponds to the off-period of the output transistor 181A (a period in which the output-stage circuit 180A is to be set to the outputting low level state). The rising edge timing of the signal COMP1 is equivalent to the turn-on timing of the output transistor 181A. Since the output transistor 181A is turned off after the on-time $T_{ON1}$ lapses from turning-on of the output transistor 181A, it may also be said that the TON setting portion 150A sets the on-period and the off-period of the output transistor 181A according to the signal COMP1 and the setting configuration of the on-time $T_{ON1}$.

The TON setting portion 150B generates the driving control signal DRV2 specifying the state of the output-stage circuit 180B according to the signal COMP2. The TON setting portion 150B has a function of setting the on time $T_{ON2}$, and specifies the turn-on timing of the output transistor 181B according to the driving control signal DRV2 (in other words, the timing of switching the output-stage circuit 180B from an outputting low level state to an outputting high level state), and the on-time of the output transistor 181B, that is, the on-time $T_{ON2}$. At this point, the TON setting portion 150B refers to the signal $S_{PLL}$ inputted from the PLL circuit 160 and a current balance signal $S_{CB2}$ inputted from the current balance signal generator 210, and generates the driving control signal DRV2 (with details to be given below).

The driving control signal DRV2 is a binary signal adopting a signal level that is a low level or a high level, and specifies an on-period and an off-period of the output transistor 181B using the driving control signal DRV2. Moreover, a high-level period of the driving control signal DRV2 corresponds to the on-period of the output transistor 181B (a period in which the output-stage circuit 180B is to be set to the outputting high level state), and a low-level period of the driving control signal DRV2 corresponds to the off-period of the output transistor 181B (a period in which the output-stage circuit 180B is to be set to the outputting low level state). The rising edge timing of the signal COMP2 is equivalent to the turn-on timing of the output transistor 181B. Since the output transistor 181B is turned off after the on-time $T_{ON2}$ lapses from turning-on of the output transistor 181B, it may also be said that the TON setting portion 150B sets the on-period and the off-period of the output transistor 181B according to the signal COMP2 and the setting configuration of the on-time $T_{ON2}$.

The PLL circuit 160 is a phase synchronization circuit. The signal in rectangular waves having the predetermined reference frequency $f_{CLK}$, that is, a reference clock signal CLK, and the driving control signal DRV1 outputted from the TON setting portion 150A are inputted to the PLL circuit 160. The PLL circuit 160 outputs the signal $S_{PLL}$ corresponding to the phase difference between the reference clock signal CLK and the driving control signal DRV1 (that is, the difference between the phase of the reference clock signal CLK and the phase of the driving control signal DRV1) to the TON setting portions 150A and 150B.

The output-stage driving portion 170A switch-drives the output-stage circuit 180A according to the driving control signal DRV1. The switch-driving of the output-stage circuit 180A includes alternately switching the state of the output-stage circuit 180A between the outputting low level state and the outputting high level state. That is to say, the output-stage driving portion 170A is connected to the gates of the transistors 181A and 182A, the switch terminal 252A and the ground, and controls the gate voltages (more specifically, gate-source voltages) of the transistors 181A and 182A (assuming that a protection operation of the protection circuit 200A is not performed), in a manner that the output-stage circuit 180A becomes the outputting low level state in the low-level period of the driving control signal DRV1 and becomes the outputting high level state in the high-level period of the driving control signal DRV1. Moreover, the voltage needed for switching the output transistor 181A is outputted from the input voltage $V_{IN}$ by a bootstrap circuit (not shown).

The output-stage driving portion 170B switch-drives the output-stage circuit 180B according to the driving control signal DRV2. The switch-driving of the output-stage circuit 180B includes alternately switching the state of the output-stage circuit 180B between the outputting low level state and the outputting high level state. That is to say, the output-stage driving portion 170B is connected to the gates of the transistors 181B and 182B, the switch terminal 252B and the ground, and controls the gate voltages (more specifically, gate-source voltages) of the transistors 181B and 182B (assuming that a protection operation of the protection circuit 200A is not performed), in a manner that the output-stage circuit 180B becomes the outputting low level state in the low-level period of the driving control signal DRV2 and becomes the outputting high level state in the high-level period of the driving control signal DRV2. Moreover, the voltage needed for switching the output transistor 181B is outputted from the input voltage $V_{IN}$ by a bootstrap circuit (not shown).

The current sensor 190A detects the first target current (more specifically, detecting the current value of the first target current). The first target current is a current that flows through the switch terminal 252A. The current sensor 190A may also detect the first target current by means of detecting the current flowing between the source and the drain of the output transistor 181A or the current flowing between the source and the drain of the synchronous rectifier transistor 182A. If short-circuitry such as simultaneous turning on of the transistors 181A and 182A is disregarded, the current flowing through the switch terminal 252A flows through the coil L1, and so the first target current is the coil current $I_{L1}$. The protection circuit 200A controls the output-stage driving portion 170A according to the detection result of the current sensor 190A, and accordingly performs a specific protection operation (over-current protection and negative-current protection).

The current sensor 190B detects the second target current (more specifically, detecting the current value of the second target current). The second target current is a current that flows through the switch terminal 252B. The current sensor 190B may also detect the second target current by means of detecting the current flowing between the source and the drain of the output transistor 181B or the current flowing between the source and the drain of the synchronous rectifier transistor 182B. If short-circuitry such as simultaneous turning on of the transistors 181B and 182B is disregarded, the current flowing through the switch terminal 252B flows through the coil L2, and so the second target current is the coil current $I_{L2}$. The protection circuit 200B controls the output-stage driving portion 170B according to the detection result of the current sensor 190B, and accordingly performs a specific protection operation (over-current protection and negative-current protection).

The current balance signal generator 210 generates current balance signals $S_{CB1}$ and $S_{CB2}$ for adjusting (correcting) the on-times $T_{ON1}$ and $T_{ON2}$ according to requirements by means of comparing the detection results of the current sensors 190A and 190B, and outputs the generated current balance signals $S_{CB1}$ and $S_{CB2}$ to the TON setting portions 150A and 150B, respectively.

FIG. 3(a) shows a circuit structure of an example of the structure of the pulse generator 120A including the ripple injecting portion 126A, and FIG. 3(b) shows a circuit structure of an example of the structure of the pulse generator 120B including the ripple injecting portion 126B.

The ripple injecting portion 126A in FIG. 3(a) includes a buffer circuit 126A_1, a resistor 126A_2, and capacitors 126A_3 and 126A_4. The driving control signal DRV1 is inputted to an input terminal of the buffer circuit 126A_1. Thus, in the high-level period of the driving control signal DRV1, the level of an output signal of the buffer circuit 126A_1 also becomes the high level; in the low-level period of the driving control signal DRV1, the level of the output signal of the buffer circuit 126A_1 also becomes the low level. However, since the buffer circuit 126A_1 operates by using a voltage proportional to the input voltage $V_{IN}$ ($V_{IN}/4$ herein) as a positive-side power supply voltage and the ground as a negative-side power supply voltage, in the output signal of the buffer circuit 126A_1, the high level substantially has the positive-side power supply voltage ($V_{IN}/4$ herein) of the buffer circuit 126A_1 and the lower level substantially has a 0 V voltage. The output signal of the buffer circuit 126A_1 is applied to one terminal of the resistor 126A_2, and the other terminal of the resistor 126A_2 is connected to a node 124A via the capacitor 126A_3 and is connected to a node 125A via the capacitor 126A_4.

Figure 3:
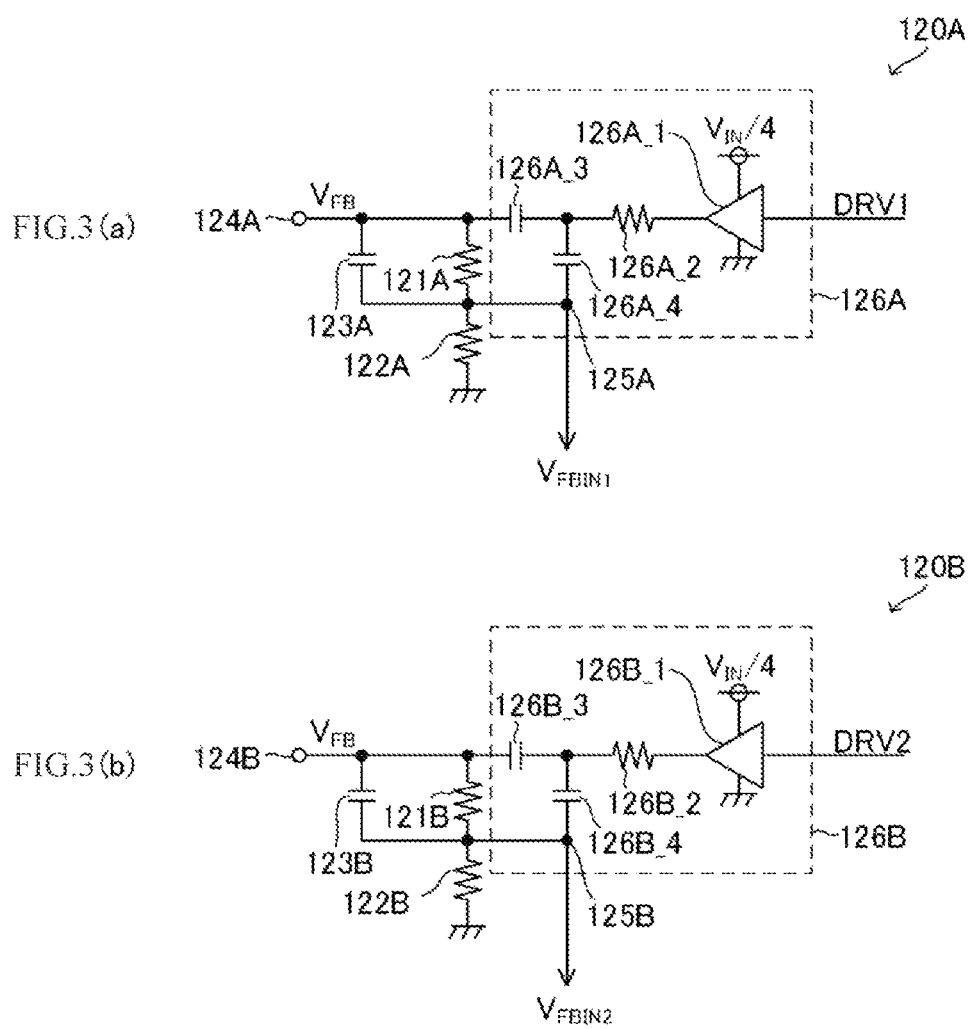
FIGS. 3(a) and 3(b) are diagrams of an exemplary structure of a pulse generator in FIG. 1.

In the high-level period and the low-level period of the driving control signal DRV1, the switch voltage $V_{LX1}$ is controlled in a manner of becoming the high level and the low level, and so according to the structure in FIG. 3(*a*), the feedback pulsating voltage $V_{FBIN1}$ variant with the switch voltage $V_{LX1}$ on the basis of the feedback voltage $V_{FB}$ can be obtained. For the feedback pulsating voltage $V_{FBIN1}$, being variant on the basis of the feedback voltage $V_{FB}$ means that the feedback pulsating voltage $V_{FBIN1}$ is variant by regarding a voltage proportional (a divided voltage of the voltage $V_{FB}$ herein) as the center.

Moreover, the structure in FIG. 3(*a*) is merely an example, and variations modifications may be made to the circuit structures of the ripple injecting portion 126A and the pulse generator 120A, as long as the pulsating feedback voltage $V_{FBIN1}$ having the same characteristics is obtained. The buffer circuit 126A_1 may also be omitted from the circuit in FIG. 3(*a*), and the switch voltage $V_{LX1}$ itself or a divided voltage of the switch voltage $V_{LX1}$ may be inputted to one terminal between the two terminals of the resistor 126A_2 that is not connected to the side of the capacitors 126A_3 and 126A_4.

The ripple injecting portion 126B in FIG. 3(*b*) includes a buffer circuit 126B_1, a resistor 126B_2, and capacitors 126B_3 and 126B_4. The driving control signal DRV2 is inputted to an input terminal of the buffer circuit 126B_1. Thus, in the high-level period of the driving control signal DRV2, the level of an output signal of the buffer circuit 126B_1 also becomes the high level; in the low-level period of the driving control signal DRV2, the level of the output signal of the buffer circuit 126B_1 also becomes the low level. However, since the buffer circuit 126B_1 operates by using a voltage proportional to the input voltage $V_{IN}$ ($V_{IN}/4$ herein) as a positive-side power supply voltage and the ground as a negative-side power supply voltage, in the output signal of the buffer circuit 126B_1, the high level substantially has the positive-side power supply voltage ($V_{IN}/4$ herein) of the buffer circuit 126B_1 and the lower level substantially has a 0 V voltage. The output signal of the buffer circuit 126B_1 is applied to one terminal of the resistor 126B_2, and the other terminal of the resistor 126B_2 is connected to a node 124B via the capacitor 126B_3 and is connected to a node 125B via the capacitor 126B_4.

In the high-level period and the low-level period of the driving control signal DRV2, the switch voltage $V_{LX2}$ is controlled in a manner of becoming the high level and the low level, and so according to the structure in FIG. 3(*b*), the feedback pulsating voltage $V_{FBIN2}$ variant with the switch voltage $V_{LX2}$ on the basis of the feedback voltage $V_{FB}$ can be obtained. For the feedback pulsating voltage $V_{FBIN2}$, being variant on the basis of the feedback voltage $V_{FB}$ means that the feedback pulsating voltage $V_{FBIN2}$ is variant by regarding a voltage proportional (a divided voltage of the voltage $V_{FB}$ herein) as the center.

Moreover, the structure in FIG. 3(*b*) is merely an example, and variations modifications may be made to the circuit structures of the ripple injecting portion 126B and the pulse generator 120B, as long as the pulsating feedback voltage $V_{FBIN2}$ having the same characteristics is obtained. The buffer circuit 126B_1 may also be omitted from the circuit in FIG. 3(*b*), and the switch voltage $V_{LX2}$ itself or a divided voltage of the switch voltage $V_{LX2}$ may be inputted to one terminal between the two terminals of the resistor 126B_2 that is not connected to the side of the capacitors 126B_3 and 126B_4.

As described above, in the DC/DC converter 10, feedback control of keeping the potential difference between the non-inverting input terminal and the inverting input terminal of the error amplifier 111 at zero is performed by means of a basic feedback loop from the error voltage generator 110 to a part where the output voltage $V_{OUT}$ is generated, and the output voltage $V_{OUT}$ is stabilized at a predetermined target voltage $V_{TG}$ (that is, matching or approximating the target voltage $V_{TG}$) by means of adjusting the error voltage $V_{ERR}$. The target voltage $V_{TG}$ is specified by the ratio of the resistance values of the resistors 112 and 113 and the reference voltage $V_{REF}$.

The operation for generating the driving control signals DRV1 and DRV2 are additionally described. For sake of convenience, the existence of the current balance signals $S_{CB1}$ and $S_{CB2}$ is omitted, and the method for generating the driving control signal DRV1 according to the signals COMP1 and $S_{PLL}$ and the method for generating the driving control signal DRV2 according to the signals COMP2 and $S_{PLL}$ are described. The PLL circuit 160 generates the signal SPLL in a manner that the phase difference between the reference clock signal CLK and the driving control signal DRV1 (the difference between the phase of the reference clock signal CLK and the phase of the driving control signal DRV1) becomes zero. Similar to the driving control signals DRV1 and DRV2, the reference clock signal CLK is a signal in rectangular waves having a signal level that is a low level or a high level. The state in which the phase difference between the reference clock signal CLK and the driving control signal DRV1 becomes zero means that the reference clock signal CLK and the driving control signal DRV1 have mutually the same frequency, and a state in which the rising edge timing of the reference clock signal CLK coincides with the rising edge timing of the driving control signal DRV1 expresses the keeping of such state as PLL lock. Apart from a transition state, the signals COMP1 and COMP2 in principle have mutually the same frequency, and the phase difference between the signals COMP1 and COMP2 is kept at 180°. Thus, in a PLL lock state, the frequencies of the driving control signals DRV1 and DRV2 (that is, the switch frequency $f_{SW1}$ of the output-stage circuit 180A and the switch frequency $f_{SW2}$ of the output-stage circuit 180B) coincides with the frequency of the reference clock signal CLK, that is, the reference frequency $f_{CLK}$.

Figure 4:
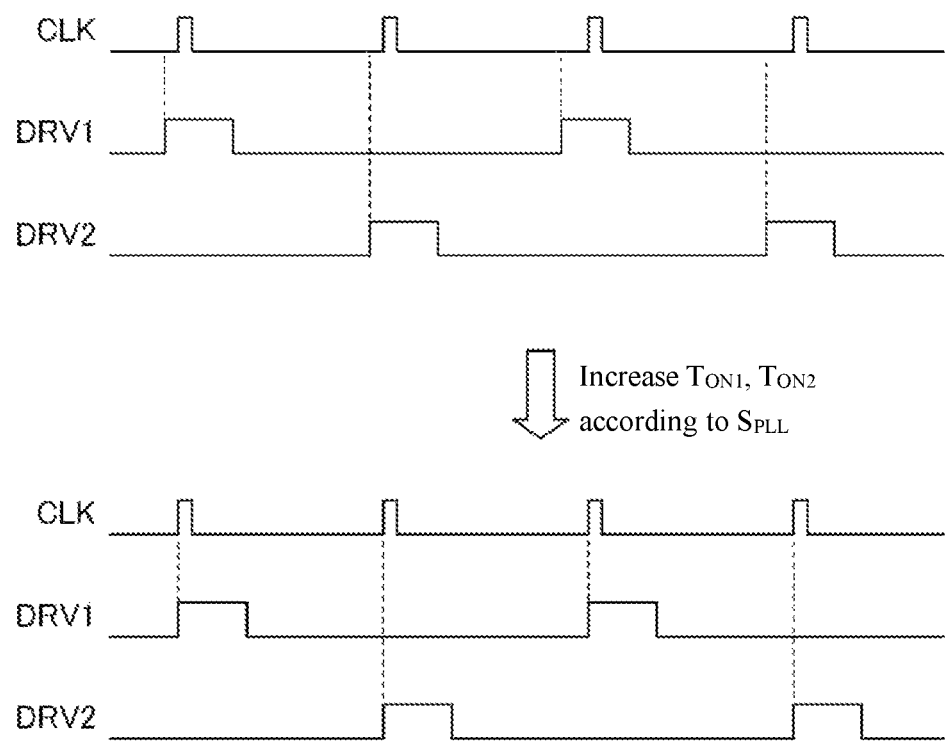
FIG. 4 is a diagram for illustrating the function of a phase-locked loop (PLL) circuit in FIG. 1.

Referring to FIG. 4, a state in which the phase of the driving control signal DRV1 is ahead relative to that of the reference clock signal CLK is equivalent to a state in which the frequencies of the driving control signals DRV1 and DRV2 are higher than the reference frequency $f_{CLK}$. At this point, the PLL circuit 160 outputs the signal $S_{PLL}$ that increases the on-times $T_{ON1}$ and $T_{ON2}$ by the same amount of time to the TON setting portions 150A and 150B, and the TON setting portions 150A and 150B increase the on-times $T_{ON1}$ and $T_{ON2}$ by the same amount of time according to the signal $S_{PLL}$. The increased amount of time is preferably proportional to the size of the phase difference between the reference clock signal CLK and the driving control signal DRV1. Moreover, initial values of the on-times $T_{ON1}$ and $T_{ON2}$ are a common reference on-time $T_{ONREF}$. Assuming that the error voltage $V_{ERR}$ is constant when the on-times $T_{ON1}$ and $T_{ON2}$ are increased, a generation interval between switching from "$V_{FBIN\_AVE}$>$V_{ERR}$" to "$V_{FBIN\_AVE}$<$V_{ERR}$" is increased by increasing the average voltage $V_{FBIN\_AVE}$, and so the frequency of the signal COMP becomes lower. That is to say, the frequencies of the driving control signals DRV1 and DRV2 become lower and approximate the reference frequency $f_{CLK}$.

Figure 5:
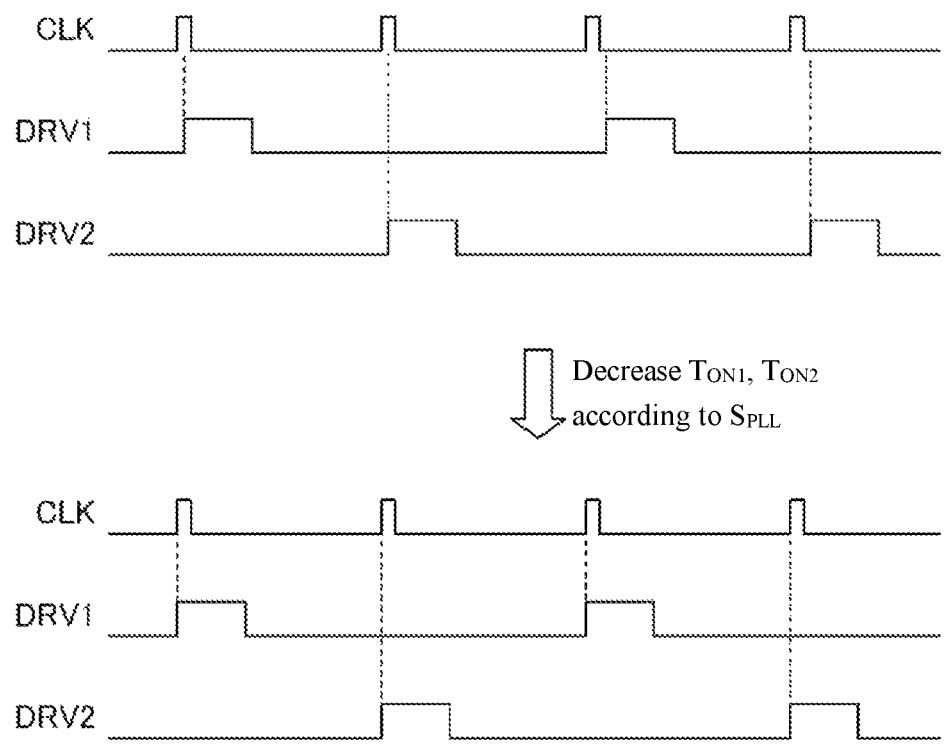
FIG. 5 is a diagram for illustrating the function of the PLL circuit in FIG. 1.

Referring to FIG. 5, a state in which the phase of the driving control signal DRV1 is behind relative to that of the reference clock signal CLK is equivalent to a state in which the frequencies of the driving control signals DRV1 and DRV2 are lower than the reference frequency $f_{CLK}$. At this point, the PLL circuit 160 outputs the signal $S_{PLL}$ that decreases the on-times $T_{ON1}$ and $T_{ON2}$ by the same amount of time to the TON setting portions 150A and 150B, and the TON setting portions 150A and 150B decrease the on-times $T_{ON1}$ and $T_{ON2}$ by the same amount of time according to the signal $S_{PLL}$. The decreased amount of time is preferably proportional to the size of the phase difference between the reference clock signal CLK and the driving control signal DRV1. Moreover, initial values of the on-times $T_{ON1}$ and $T_{ON2}$ are the common reference on-time $T_{ONREF}$. Assuming that the error voltage $V_{ERR}$ is constant when the on-times $T_{ON1}$ and $T_{ON2}$ are decreased, a generation interval between switching from "$V_{FBIN\_AVE}$>$V_{ERR}$" to "$V_{FBIN\_AVE}$<$V_{ERR}$" is decreased by reducing the average voltage $V_{FBIN\_AVE}$, and so the frequency of the signal COMP is becomes higher. That is to say, the frequencies of the driving control signals DRV1 and DRV2 become higher and approximate the reference frequency $f_{CLK}$.

The frequencies of the driving control signals DRV1 and DRV2 (that is, the switch frequencies $f_{SW1}$ and $f_{SW2}$) match or approximate the reference frequency $f_{CLK}$ by means of performing the control using the PLL circuit 160, and PLL lock is achieved in a stable state. That is to say, the frequencies of the driving control signals DRV1 and DRV2 (that is, the switch frequencies $f_{SW1}$ and $f_{SW2}$) coincide with the reference frequency $f_{CLK}$.

Figure 6:
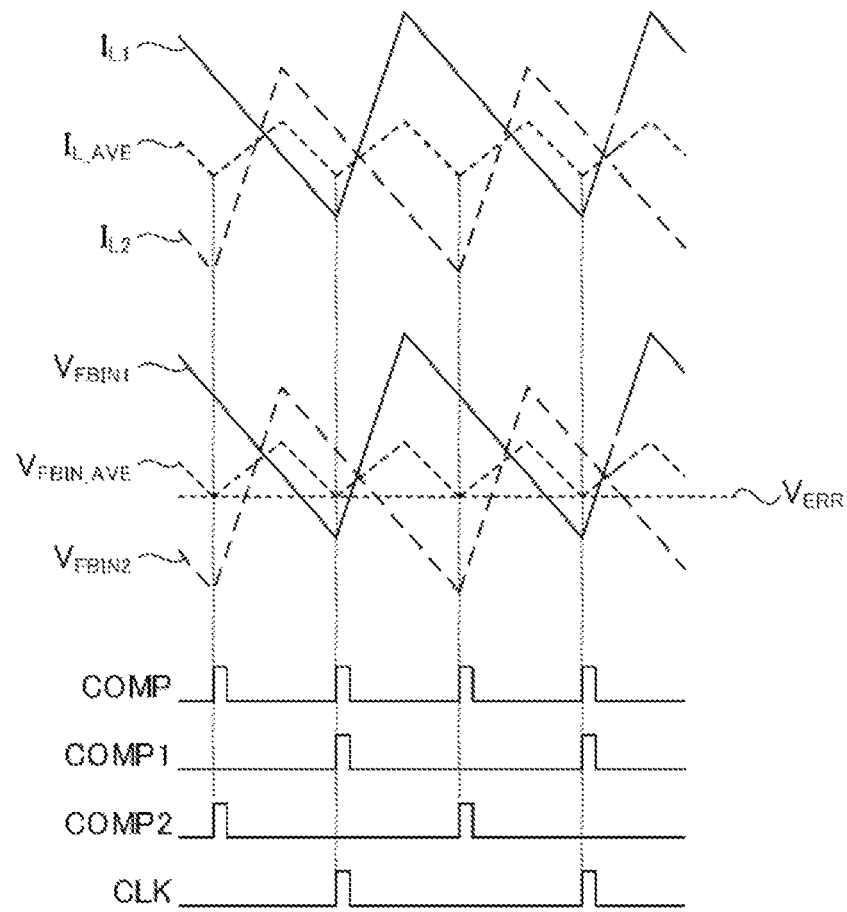
FIG. 6 is a waveform diagram of some currents, voltages and signals in a state of unbalanced currents in the first embodiment of the disclosure.

Next, the function of the current balance signal generator 210 is described. Although having waveforms similar to those of the coil currents $I_{L1}$ and $I_{L2}$, the feedback pulsating voltages $V_{FBIN1}$ and $V_{FBIN2}$ do not represent the physical quantities of the coil currents $I_{L1}$ and $I_{L2}$, and current balance between the coil currents $I_{L1}$ and $I_{L2}$ needs to be additionally obtained. That is to say, assuming that the current balance signal generator 210 is absent, the coil currents $I_{L1}$ and $I_{L2}$ may be stable at a non-equal state, as shown in FIG. 6. FIG. 6 shows a state of a stable condition of "$I_{L1}$>$I_{L2}$". In this case, if the on-time $T_{ON1}$ is reduced and corrected on one hand and the on-time $T_{ON2}$ is increased and correct on the other hand, it is expected that "$I_{L1}$=$I_{L2}$" be achieved, and the state in FIG. 6 will then transform to the state shown in FIG. 2 as "$I_{L1}$=$I_{L2}$" becomes true. Moreover, the condition "$I_{L1}$>$I_{L2}$" specifically means a condition that the maximum value, average value and minimum value of the coil current $I_{L1}$ are respectively more than the maximum value, average value and minimum value of the coil current $I_{L2}$; the condition "$I_{L1}$=$I_{L2}$" specifically means a condition that the maximum value, average value and minimum value of the coil current $I_{L1}$ are respectively coincide with the maximum value, average value and minimum value of the coil current $I_{L2}$.

To achieve "$I_{L1}$=$I_{L2}$", the DC/DC converter 10 is provided therein with the current balance signal generator 210.

The detection result of the first target current obtained by the current sensor 190A and the detection result of the second target current obtained by the current sensor 190B are inputted to the current balance signal generator 210. Current, a short-circuitry abnormality of simultaneously turning-on of the transistors 181A and 182A is non-existent. Thus, the first target current detected by the current sensor 190A is the coil current $I_{L1}$ flowing through the switch terminal 252A, and the second target current detected by the current sensor 190B is the coil current $I_{L2}$ flowing through the switch terminal 252B.

According to the detection result of the first target current (the coil current $I_{L1}$) provided from the current sensor 190A and the detection result of the second target current (the coil current $I_{L2}$) provided from the current sensor 190B, the current balance signal generator 210 generates the current balance signals $S_{CB1}$ and $S_{CB2}$ for the size of the first target current to be equal to the size of the second target current. When the first target current is greater than the second target current, the TON setting portions 150A and 150B reduce and correct the on-time $T_{ON1}$ and increase and correct the on-time $T_{ON2}$ according to the current balance signals $S_{CB1}$ and $S_{CB2}$; when the first target current is less than the second target current, the TON setting portions 150A and 150B increase and correct the on-time $T_{ON1}$ and decrease and correct the on-time $T_{ON2}$ according to the current balance signals $S_{CB1}$ and $S_{CB2}$. The first target current being greater than the second target current means specifically means that an evaluation value of the first target current is greater than an evaluation value of the second target current, and the first target current being less than the second target current specifically means that an evaluation value of the first target current is less than an evaluation value of the second target current. The evaluation values of the first and second target currents may be the average values of the first and second target currents, the maximum values of the first and second target currents, or the minimum values of the first and second target currents.

Operation examples of using the average values of the first and second target currents as the evaluation values of the first and second target currents are described below.

Figure 7:
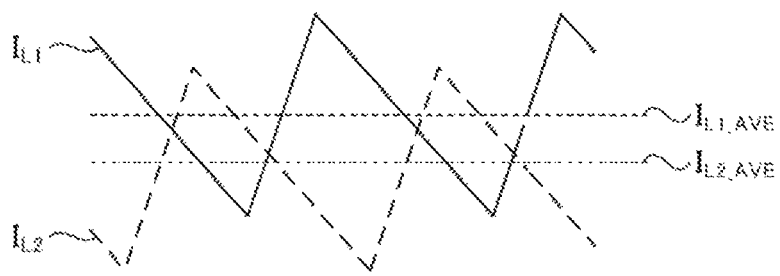
FIG. 7 is a diagram for illustrating the function of a current balance signal generator in FIG. 1.

The current sensor 190A detects the current flowing between the drain and the source of the synchronous rectifier transistor 182A as the first target current in a period in which the output-stage circuit 180A is in the outputting low level state (to be referred to as a first low-level period below), and outputs first coil current information representing the detection result to the generator 210. The average value of the first target current in the first low-level period of each switch cycle of the output-stage circuit 180A is specified according to the first coil current information. The average value of the first target current represents an average value $I_{L1\_AVE}$ (referring to FIG. 7) of the coil current $I_{L1}$ in the first low-level period. The average value $I_{L1\_AVE}$ is derived by using the switch cycle of the output-stage circuit 180A as the unit.

The current sensor 190B detects the current flowing between the drain and the source of the synchronous rectifier transistor 182B as the second target current in a period in which the output-stage circuit 180B is in the outputting low level state (to be referred to as a second low-level period below), and outputs second coil current information representing the detection result to the generator 210. The average value of the second target current in the second low-level period of each switch cycle of the output-stage circuit 180B is specified according to the second coil current information. The average value of the second target current represents an average value $I_{L2\_AVE}$ (referring to FIG. 7) of the coil current $I_{L2}$ in the second low-level period. The average value $I_{L2\_AVE}$ is derived by using the switch cycle of the output-stage circuit 180B as the unit.

The current balance signal generator 210 sets the average value $I_{L1\_AVE}$ as a first evaluation value, sets the average value $I_{L2\_AVE}$ as a second evaluation value, and compares the first and second evaluation values. Since the first and second evaluation values are sequentially updated, the generator 210 repeatedly performs the operation of comparing the latest first and second evaluation values.

In a first unbalanced condition that the first evaluation value is greater than the second evaluation value, the current balance signal generator 210 generates the current balance signal $S_{CB1}$ giving an instruction for decreasing and correcting the on-time $T_{ON1}$, and on the other hand generates the current balance signal $S_{CB2}$ giving an instruction for increasing and correcting the on-time $T_{ON2}$. In the first unbalanced condition, the decreased amount for correcting the on-time $T_{CON1}$ and the increased amount for correcting the on-time $T_{CON2}$ may correspond to the value of a difference between the first and second evaluation values, or may be a specific fixed amount.

In the first unbalanced condition, the TON setting portion 150A decreases and corrects, according to the current balance signal $S_{CB1}$, the on-time $T_{ON1}$ determined based on the signal $S_{PLL}$, and outputs the driving control signal DRV1 that specifies the decreased and corrected on-time $T_{ON1}$ (hence the length of the high-level period of the driving control signal DRV1 is the decreased and corrected on-time $T_{ON1}$).

In the first unbalanced condition, the TON setting portion 150B increases and corrects, according to the current balance signal $S_{CB2}$, the on-time $T_{ON2}$ determined based on the signal $S_{PLL}$, and outputs the driving control signal DRV2 that specifies the increased and corrected on-time $T_{ON2}$ (hence the length of the high-level period of the driving control signal DRV2 is the increased and corrected on-time $T_{ON2}$).

In a second unbalanced condition that the first evaluation value is less than the second evaluation value, the current balance signal generator 210 generates the current balance signal $S_{CB1}$ giving an instruction for increasing and correcting the on-time $T_{ON1}$, and on the other hand generates the current balance signal $S_{CB2}$ giving an instruction for decreasing and correcting the on-time $T_{ON2}$. In the second unbalanced condition, the increased amount for correcting the on-time $T_{ON1}$ and the decreased amount for correcting the on-time $T_{ON2}$ may correspond to the value of the difference between the first and second evaluation values, or may be a specific fixed amount.

In the second unbalanced condition, the TON setting portion 150A increases and corrects, according to the current balance signal $S_{CB1}$, the on-time $T_{ON1}$ determined based on the signal $S_{PLL}$, and outputs the driving control signal DRV1 that specifies the increased and corrected on-time $T_{ON1}$ (hence the length of the high-level period of the driving control signal DRV1 is the increased and corrected on-time $T_{ON1}$).

In the second unbalanced condition, the TON setting portion 150B decreases and corrects, according to the current balance signal $S_{CB2}$, the on-time $T_{ON2}$ determined based on the signal $S_{PLL}$, and outputs the driving control signal DRV2 that specifies the decreased and corrected on-time $T_{ON2}$ (hence the length of the high-level period of the driving control signal DRV2 is the decreased and corrected on-time $T_{ON2}$).

As described above, when the first evaluation value corresponding to the first coil current $I_{L1}$ is greater than the second evaluation corresponding the second coil current $I_{L2}$, the difference between the first and second evaluation values is reduced by decreasing and correcting the on-time $T_{ON1}$ and increasing and correcting the on-time $T_{ON2}$. On the other hand, when it is detected that the first evaluation value is less than the second evaluation value, the difference between the first and second evaluation values is reduced by increasing and correcting the on-time $T_{ON1}$ and decreasing and correcting the on-time $T_{ON2}$. By repeatedly performing the correction (adjustment) above, the difference between the first and second evaluation values is kept at zero or near zero. That is to say, the difference between the first target current (the coil current $I_{L1}$) and the second target current (the coil current $I_{L2}$) is reduced. More specifically, the difference between the average value of the coil current $I_{L1}$ and the average value of the coil current $I_{L2}$ is reduced, and as a result, the difference between the maximum value or the minimum value of the coil current $I_{L1}$ and the maximum value or the minimum value of the coil current $I_{L2}$ is also reduced.

Moreover, the current sensor 190A may also detect the current flowing between the drain and the source of the synchronous rectifier transistor 181A as the first target current in a period in which the output-stage circuit 180A is in the outputting high level state (to be referred to as a first high-level period below), and output the first coil current information representing the detection result to the generator 210. Further, the current sensor 190B may also detect the current flowing between the drain and the source of the synchronous rectifier transistor 181B as the second target current in a period in which the output-stage circuit 180B is in the outputting high level state (to be referred to as a second high-level period below), and output second coil current information representing the detection result to the generator 210. In this case, the average of the first target current in the first high-level period of each switch cycle of the output-stage circuit 180A is specified, and the average value of the second target current in the second high-level period of each switch cycle of the output-stage circuit 180B is specified according to the second coil current information. Moreover, in the generator 210, the average value of the first target current in the first high-level period may be set as the first evaluation value, and the average value of the second target current in the second high-level period may be set as the second evaluation value.

As described above, the maximum value or the minimum value of each target current but not the average value of each target current may be used as the evaluation value. That is to say, in the current balance signal generator 210, the maximum values of the first and second target currents in each switch cycle may also be used as the first and second evaluation values, and these values are compared; alternatively, the minimum values of the first and second target currents in each switch cycle may also be used as the first and second evaluation values, and these values are compared.

For better illustration, the function of the PLL circuit 160 and the function of the current balance signal generator 210 are described separately. However, in the DC/DC converter 110, in addition to the basic feedback circuit including the error voltage generator 110, a PLL feedback loop including the PLL circuit 160 and the TON setting portions 150A and 150B, and a current balance feedback loop including the current balance signal generator 210 and the TON setting portions 150A and 150B are further formed. With the functions of these feedback loops, a feedback operation for matching or approximating the output voltage $V_{OUT}$ with the target voltage $V_{TG}$, a feedback operation for matching or approximating the switch frequencies $f_{SW1}$ and $f_{SW2}$ with the reference frequency $f_{CLK}$, and a feedback operation for equaling the coil currents $I_{L1}$ and $I_{L2}$ are simultaneously performed.

Starting from a certain stable state, when the value of the load LD (that is, the load current $I_{OUT}$) changes by decreasing drastically, the output voltage $V_{OUT}$ is slightly deviated in a transition form from the target voltage $V_{TG}$. Moreover, in a transition state, the switch frequencies $f_{SW1}$ and $f_{SW2}$ are slightly deviated from the reference frequency $f_{CLK}$, and an offset is generated between the coil currents $I_{L1}$ and $I_{L2}$. However, after necessary time lapses, "$V_{OUT}=V_{TG}$", "$f_{SW1}=f_{SW2}=f_{CLK}$" and "$I_{L1}=I_{L2}$" are again achieved in forms adapted to the changed condition of the load.

When the DC/DC converter 10 is activated, the PLL is not locked during the rising process of the output voltage $V_{OUT}$ from 0V toward the target voltage $V_{TG}$; however, the switch phase difference between the first and second phases is nonetheless ensured by means of alternately allocating the pulses in the signal COMP to the signals COMP1 and COMP2 during the rising process. Moreover, during the rising process of the output voltage $V_{OUT}$, the switch frequencies $f_{SW1}$ and $f_{SW2}$ constantly approach the reference frequency $f_{CLK}$, and the coil currents $I_{L1}$ and $I_{L2}$ are equalized.

The DC/DC converter 10 may operate in any of multiple operation modes, which may include a pulse frequency modulation (PFM) mode and a PWM mode. In the PWM mode, the operation described in the embodiment is performed, that is, the output-stage circuits 180A and 180B are switch-driven using PWM. In contrast, in the PFM mode, the output-stage circuits 180A and 180B are switch-driven using PFM. The detailed description of the operation in the PFM mode is omitted; however, shortly after switching the operation mode of the DC/DC converter 10 from the PFM mode to the PWM mode, the switch phase difference between the first and second phases is nonetheless ensured by means of alternately allocating the pulses in the signal COMP to the signals COMP1 and COMP2.

According to the DC/DC converter 10 of the embodiment, a phase difference of 180° between switch-driving of the output-stage circuits 180A and 180B is ensured, and the on-time control similar to the constant on-time control method is performed to achieve high load performance response. Moreover, power efficiency is optimized (maximized) by means of equalization control on the coil currents $I_{L1}$ and $I_{L2}$.

In addition, the on-times $T_{ON1}$ and $T_{ON2}$ are focused as the targets of setting, adjustment and correction herein; however, the setting and increase/decrease of the on-time $T_{ON1}$ may also be the setting and increase/decrease of an on duty cycle $D_{ON1}$, and the setting and increase/decrease of the on-time $T_{ON2}$ may also be the setting and increase/decrease of on duty cycle $D_{ON2}$. Thus, the TON setting portion 150A may be in charge of the setting and increase/decrease of the on duty cycle $D_{ON1}$, and the TON setting portion 150B may be in charge of the setting and increase/decrease of the on duty cycle $D_{ON2}$ (the same applies to any other embodiments described below). The $D_{ON1}$ refers to the ratio occupied by the on-time $T_{ON1}$ in each cycle of switch-driving of the output-stage circuit 180A (equivalent to the ratio occupied by the on-time $T_{ON1}$ within the time of the reciprocal of the switch frequency $f_{SW1}$), and $D_{ON2}$ refers to the ratio occupied by the on-time $T_{ON2}$ in each cycle of switch-driving of the output-stage circuit 180B (equivalent to the ratio occupied by the on-time $T_{ON2}$ within the time of the reciprocal of the switch frequency $f_{SW2}$).

Second Embodiment

The second embodiment of the disclosure is described below. The second embodiment and third to sixth embodiments below are embodiments based on the first embodiment. With respect to items specifically described in the second to sixth embodiments, the details of the first embodiment are applicable to the second to sixth embodiments, given that no contradictions are incurred. In the description associated with the second embodiments, the details associated with the second embodiment overrule in case of contradictions between the first and second embodiments (the same applies to the third to sixth embodiments below). Given that no contradictions are incurred, multiple embodiments among the first to sixth embodiments may be combined as desired.

Figure 8:
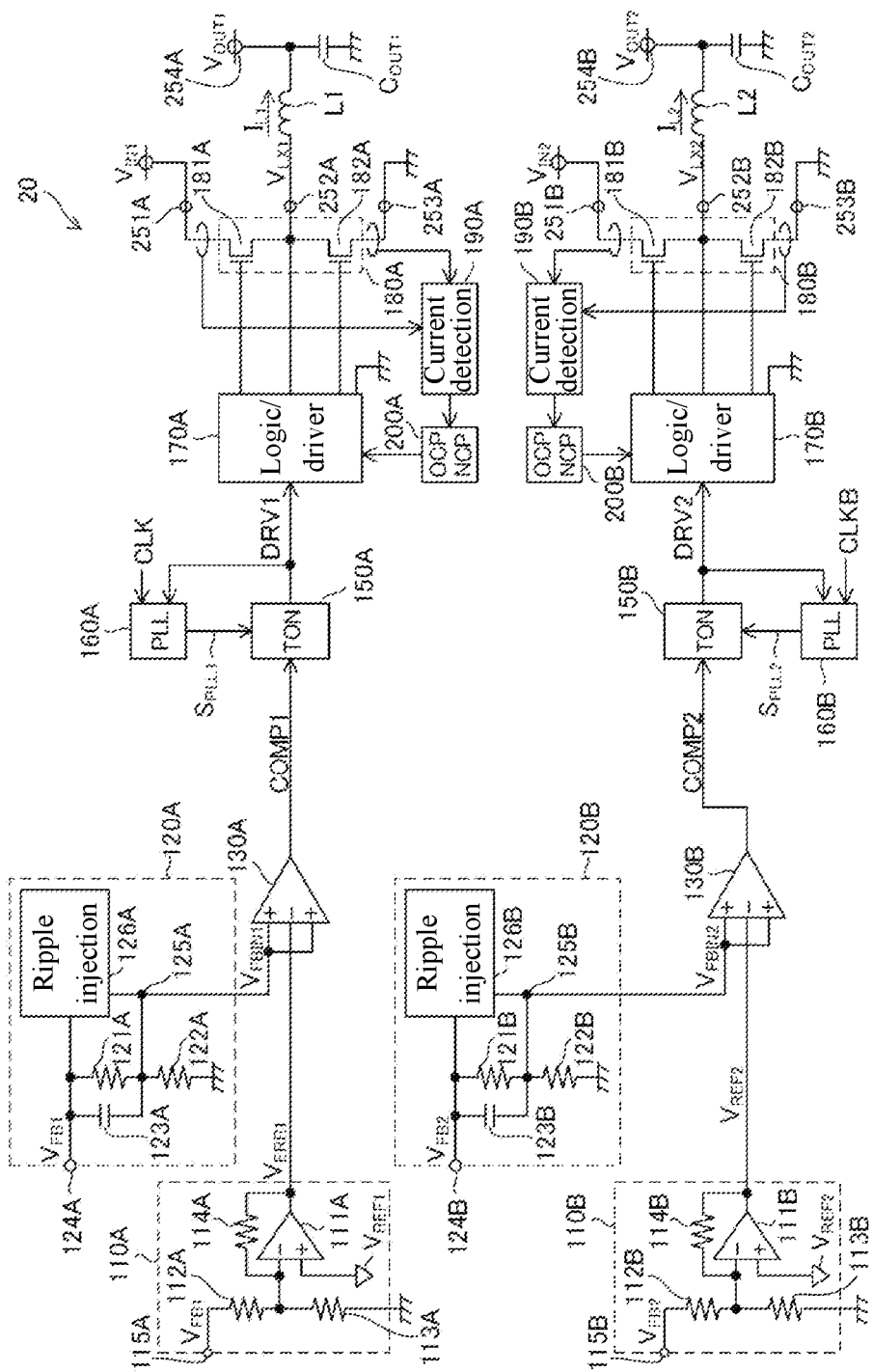
FIG. 8 is an overall structural diagram of a DC/DC converter according to a second embodiment of the disclosure.

A part of the configuration of the DC/DC converter 10 in FIG. 1 may be used to form a step-down single-phase DC/DC converter having multiple channels. FIG. 8 shows an overall structural diagram of a DC/DC converter 20 according to a second embodiment of the disclosure. The DC/DC converter 20 is a step-down single-phase DC/DC converter having two channels. The two channels include a first channel and a second channel. The DC/DC converter 20 generates an output voltage $V_{OUT1}$ by means of stepping down an input voltage $V_{IN1}$ in the first channel, and generates an output voltage $V_{OUT2}$ by means of stepping down an input voltage $V_{IN2}$ in the second channel.

The input voltages $V_{IN1}$ and $V_{IN2}$ are positive DC voltages, and have, for example, voltage values ranging from 4.0 V to 18.0 V. Whether the input voltages $V_{IN1}$ and $V_{IN2}$ are the same is disregarded. The output voltages $V_{OUT1}$ and $V_{OUT2}$ are lower than the input voltages $V_{IN1}$ and $V_{IN2}$, and have stable positive DC voltage values, except for in the transition state of the DC/DC converter 20. Target values (value of target voltages $V_{TG1}$ and $V_{TG2}$ to be described shortly) of the output voltages $V_{OUT1}$ and $V_{OUT2}$ have, for example, voltage values ranging from 0.6 V to 3.4 V. Whether the output voltages $V_{OUT1}$ and $V_{OUT2}$ are the same is disregarded.

The DC/DC converter 20 is a step-down single-phase DC/DC converter having a first-channel DC/DC converter and a second-channel DC/DC converter.

The first-channel DC/DC converter is described. The first-channel DC/DC converter includes an error voltage generator 110A, a pulse generator 120A, a PWM comparator 130A, a TON setting portion 150A, a PLL circuit 160A, an output-stage driving portion 170A, an output-stage circuit 180A, a current sensor 190A, a protection circuit 200A, a coil L1, an output capacitor $C_{OUT1}$, an input terminal 251A, a switch terminal 252A, a ground terminal 253A and an output terminal 254A.

The structure of the output-stage circuit 180A is as that described in the first embodiment. However, in the DC/DC converter 20, the input terminal 251A is connected to an application terminal (a terminal applied with the input voltage $V_{IN1}$) of the input voltage $V_{IN1}$ and receives the input voltage $V_{IN1}$, the switch terminal 252A is connected to the output terminal 254A via the coil L1, and the output voltage $V_{OUT1}$ is applied to the output terminal 254A using the capacitor $C_{OUT1}$ disposed between the output terminal 254A and the ground.

By alternately turning on and off the transistors 181A and 182A in the output-stage circuit 180A, the input voltage $V_{IN1}$ is switched and the switch voltage $V_{LX1}$ in rectangular waves is generated at the switch terminal 252A. A rectifying and smoothing circuit is formed by the coil L1 and the output capacitor $C_{OUT1}$, the switch voltage $V_{LX1}$ in rectangular waves is rectified and smoothed by the rectifying and smoothing circuit, and the output voltage $V_{OUT1}$ is accordingly generated.

The error voltage generator 110A in FIG. 8 has the same structure as the error voltage generator 110 in FIG. 1. The error amplifier 111, the resistors 112, 113 and 114 and the node 115 of the error voltage generator 110 in FIG. 1 are referred to as an error amplifier 111A, resistors 112A, 113A and 114A and a node 115A in the error voltage generator 110A in FIG. 8. The node 115A is equivalent to a feedback input terminal, and a feedback voltage $V_{FB1}$ is applied to the node 115A. The feedback voltage $V_{FB1}$ is a voltage proportional to the output voltage $V_{OUT1}$. Further, the output voltage $V_{OUT1}$ itself is the feedback voltage $V_{FB1}$, and a divided voltage of the output voltage $V_{OUT1}$ may also be the feedback voltage $V_{FB1}$. The node 115A is connected to one terminal of the resistor 112A, and the other terminal of the resistor 112A is connected to an inverting input terminal of the error amplifier 111A and is connected to the ground via the resistor 113A. The predetermined reference voltage $V_{REF1}$ is applied to a non-inverting input terminal of the error amplifier 111A. The reference voltage $V_{REF1}$ has a specific positive DC voltage value. The output terminal of the error amplifier 111A is connected to the inverting input terminal of the error amplifier 111A via the resistor 114A. Thus, the error amplifier 111A and the resistors 112A to 114A form an inverting amplifier. An error voltage $V_{ERR1}$ corresponding to a difference between a voltage (a voltage applied to the inverting input terminal of the error amplifier 111A) proportional to the feedback voltage $V_{FB1}$ and the reference voltage $V_{REF1}$ is outputted from the output terminal of the error amplifier 111A.

The pulse generator 120A in FIG. 8, same as the pulse generator 120A in FIG. 1, generates a feedback pulsating voltage $V_{FBIN1}$ at the node 125A. However, in the pulse generator 120A, the feedback voltage applied to the node 124A is the feedback voltage $V_{FB1}$ based on the output voltage $V_{OUT1}$. That is to say, the pulse generator 120A generates the feedback pulsating voltage $V_{FBIN1}$ on the basis of the feedback voltage $V_{FB1}$. The feedback pulsating voltage $V_{FBIN1}$ is characterized same as that of the first embodiment, and has a waveform similar to the waveform of the coil current $I_{L1}$. Further, when the pulse generator 120A is implemented by the structure shown in FIG. 3(a), a positive-side power supply voltage of the buffer circuit 126A_1 is "$V_{IN1}/4$".

The PWM comparator 130A compares the error voltage $V_{ERR1}$ with the feedback pulsating voltage $V_{FBIN1}$ to generate the signal COMP1, and outputs the signal COMP1. More specifically, the PWM comparator 130A keeps the signal COMP1 at a low level when "$V_{FBIN\_AVE} > V_{ERR}$" is true, and when switching from "$V_{FBIN1} > V_{ERR1}$" to "$V_{FBIN1} < V_{ERR1}$" is performed each time, the signal COMP1 is set to a high level within a specific minute time starting from the switching timing as a starting point and is returned to a low level.

The TON setting portion 150A generates the driving control signal DRV1 specifying the state of the output-stage circuit 180A according to the signal COMP1 provided from the PWM comparator 130A. In the DC/DC converter 20 in FIG. 8, the PLL circuit 160A is used as the PLL circuit 160 (referring to FIG. 1), and the driving control signal DRV1 is generated regardless of how the current balance signal $S_{CB1}$ is (the current balance signal $S_{CB1}$ originally does not exist). Apart from the description above, the operation of the TON setting portion 150A is as described in the first embodiment.

The PLL circuit 160A in FIG. 8, the same as the PLL circuit 160 in FIG. 1, outputs a signal $S_{PLL1}$ corresponding to the phase difference between the reference clock signal CLK and the driving control signal DRV1 (that is, the difference between the phase of the reference clock signal CLK and the phase of the driving control signal DRV1) to the TON setting portion 150A to collaborate with the TON setting portion 150A, such that the frequency of the driving control signal DRV1 matches or approximates the reference frequency $f_{CLK}$ (the frequency of the reference clock signal CLK). The structures and operations of the output-stage circuit 170A, the current sensor 190A and the protection circuit 200A are as those described in the first embodiment.

The second-channel DC/DC converter is described. The second-channel DC/DC converter includes an error voltage generator 110B, a pulse generator 120B, a PWM comparator 130B, a TON setting portion 150B, a PLL circuit 160B, an output-stage driving portion 170B, an output-stage circuit 180B, a current sensor 190B, a protection circuit 200B, a coil L2, an output capacitor $C_{OUT2}$, an input terminal 251B, a switch terminal 252B, a ground terminal 253B and an output terminal 254B.

In the DC/DC converter 20 in FIG. 8, the structure and operation of the second-channel DC/DC converter are the same as the structure and operation of the first-channel DC/DC converter, and the items in the description with respect to the first-channel DC/DC converter are also applicable to the second-channel DC/DC converter. In an applicable case, the numerals or symbols 110A to 115A, 120A to 126A, 126A_1 to 126A_4, 130A, 150A, 160A, 170A, 180A to 182A, 190A, 200A, 251A to 254A, L1, $C_{OUT1}$, $V_{FB1}$, $V_{REF1}$, $V_{ERR1}$, $V_{LX1}$, $V_{FBIN1}$, COMP1, DRV1, $S_{PLL1}$, $V_{IN1}$, $V_{OUT1}$ and $I_{L1}$ described in relation to the first-channel DC/DC converter are respectively denoted by numerals or symbols 110B to 115B, 120B to 126B, 126B_1 to 126B_4, 130B, 150B, 160B, 170B, 180B to 182B, 190B, 200B, 251B to 254B, L2, $C_{OUT2}$, $V_{FB2}$, $V_{REF2}$, $V_{ERR2}$, $V_{LX2}$, $V_{FBIN2}$, COMP2, DRV2, $S_{PLL2}$, $V_{IN2}$, $V_{OUT2}$ and $I_{L2}$. Moreover, a clock signal CLKB is inputted to the PLL circuit 160B, as a reference clock signal. The clock signal CLKB is an inverted signal of the reference clock signal CLK.

In the first-channel DC/DC converter included in the DC/DC converter 20, feedback control of keeping the potential difference between the non-inverting input terminal and the inverting input terminal of the error amplifier 111A at zero is performed by means of a feedback loop from the error voltage generator 110A to a part where the output voltage $V_{OUT1}$ is generated, and the output voltage $V_{OUT1}$ is stabilized at a predetermined target voltage $V_{TG1}$ (that is, matching with or approximating the target voltage $V_{TG1}$) by means of adjusting the error voltage $V_{ERR1}$. The target voltage $V_{TG1}$ is specified by the ratio of the resistance values of the resistors 112A and 113A and the reference voltage $V_{REF1}$. Moreover, using the function of the PLL circuit 160A, the frequency of the driving control signal DVR1 (hence the switch frequency $f_{SW1}$ of the output-stage circuit 180A) can match or approximate the reference frequency $f_{CLK}$.

As an independent unit, the second-channel DC/DC converter included in the DC/DC converter 20, feedback control of keeping the potential difference between the non-inverting input terminal and the inverting input terminal of the error amplifier 111B at zero is performed by means of a feedback loop from the error voltage generator 110B to a part where the output voltage $V_{OUT2}$ is generated, and the output voltage $V_{OUT2}$ is stabilized at a predetermined target voltage $V_{TG2}$ (that is, matching or approximating the target voltage $V_{TG2}$) by means of adjusting the error voltage $V_{ERR2}$. The target voltage $V_{TG2}$ is specified by the ratio of the resistance values of the resistors 112B and 113B and the reference voltage $V_{REF2}$. Moreover, using the function of the PLL circuit 160B, the frequency of the driving control signal DVR2 (hence the switch frequency $f_{SW2}$ of the output-stage circuit 180B) can match or approximate the reference frequency $f_{CLK}$.

In addition, although not explicitly depicted, the output terminals 254 and 254B may also be connected to each other.

Third Embodiment

The third embodiment of the disclosure is described below. A part or all of the DC/DC converter 10 in FIG. 1 or a part or all of the DC/DC converter 20 in FIG. 8 may be formed by a semiconductor integrated circuit on a semiconductor substrate, and the semiconductor integrated circuit is encapsulated in a housing (package) formed of resin to form a semiconductor device. FIG. 9 shows a three-dimensional diagram of the appearance of a semiconductor device 500 according to a third embodiment of the disclosure.

The semiconductor device 500 includes the semiconductor integrated circuit and the housing accommodating the semiconductor integrated circuit, and multiple external terminals are disposed in the housing in a manner of exposing from the housing. Moreover, in FIG. 9, the semiconductor device 500 includes a dual flatpack non-leaded (QFN) housing (package) as a casing thereof for example; however, the type of the housing of the semiconductor device 500 may be any as desired, and the number of the external terminals of the semiconductor device 500 may also be any as desired.

In the block forming the DC/DC converter 10 in FIG. 1, when the blocks referenced by the numerals 110, 120A, 120B, 130, 140, 150A, 150B, 160, 170A, 170B, 180A, 180B, 190A, 190B, 200A, 200B and 210 are formed by the semiconductor integrated circuit of the semiconductor device 500 to realize the DC/DC converter 10 in FIG. 1, the coils L1 and L2 and the output capacitor $C_{OUT}$ are externally connected to the semiconductor device 500.

In the block forming the DC/DC converter 20 in FIG. 8, when the blocks referenced by the numerals 110A, 110B, 120A, 120B, 130A, 130B, 150A, 150B, 160A, 160B, 170A, 170B, 180A, 180B, 190A, 190B, 200A and 200B are formed by the semiconductor integrated circuit of the semiconductor device 500 to realize the DC/DC converter 20 in FIG. 8, the coils L1 and L2 and the output capacitors $C_{OUT1}$ and $C_{OUT2}$ are externally connected to the semiconductor device 500.

That is to say, the semiconductor integrated circuit of the semiconductor device 50 may also be provided circuits forming any between the DC/DC converters 10 and 20, or any between the DC/DC converters 10 and 20 may also be formed by the same semiconductor core (a chip forming the semiconductor integrated circuit). When the DC/DC 10 in FIG. 1 is formed, the functions of the error voltage generator 110B, the PWM comparator 130B and the PLL circuit 160B in FIG. 8 may be not practiced (these parts are intentionally kept inoperative although provided in the semiconductor integrated circuit), given that the connection states of the circuits in FIG. 1 are implemented to form the DC/DC converter 10. On the other hand, when the DC/DC 20 in FIG. 8 is formed, the functions of the phase control logic 140 and the current balance signal generator 210 in FIG. 1 may be not practiced (these parts are intentionally kept inoperative although provided in the semiconductor integrated circuit), given that the connection states of the circuits in FIG. 8 are implemented to form the DC/DC converter 20.

In a manufacturing phase of the semiconductor device 500, a semiconductor device 500 for exclusively forming the DC/DC converter 10 (to be referred to as a multi-phase exclusive semiconductor device 500) and a semiconductor device 500 for exclusively forming the DC/DC converter 20 (to be referred to as a single-phase exclusive semiconductor device 500) may be individually formed (manufactured).

Multiple external terminals provided at the multi-phase exclusive semiconductor device 500 include the input terminals 251A and 251B, the switch terminals 252A and 252B, and the ground terminals 253A and 253B in FIG. 1, hence including feedback input terminals. In the multi-phase semiconductor device 500, the feedback input terminals serve as external terminals to receive the feedback voltage $V_{FB}$, and are connected to the nodes 115, 124A and 124B in FIG. 1.

Multiple external terminals provided at the single-phase exclusive semiconductor device 500 include the input terminals 251A and 251B, the switch terminals 252A and 252B, and the ground terminals 253A and 253B in FIG. 8, hence including feedback input terminals. In the single-phase semiconductor device 500, first and second feedback input terminals are provided as feedback input terminals; the first feedback input terminal serves as an external terminal to receive the feedback voltage $V_{FB1}$ and is connected to the nodes 115A and 124A in FIG. 8, and the second feedback input terminal serves an external terminal to receive the feedback voltage $V_{FB2}$ and is connected to the nodes 115B and 124B in FIG. 8.

A multi-phase/single-phase switching semiconductor device 500 may also be formed (manufactured). The multi-phase/single-phase switching semiconductor device 500 selectively operates in a multi-phase mode or a single-phase mode according to a setting signal (for example, the level of the voltage applied to an external terminal) provided from the outside of the semiconductor device 500. In the multi-phase/single-phase switching semiconductor device 500, a multiplexer or a switch with switching function (neither shown) is used to selectively form any one between the circuit structure in FIG. 1 and the circuit structure in FIG. 8. According to the setting signal, the circuit structure in FIG. 1 is formed in the semiconductor device 500 in the multi-phase mode, and the circuit structure in FIG. 8 is formed in the semiconductor device 500 in the single-phase mode.

The single-phase/multi-phase switching semiconductor device 500 includes the input terminals 251A and 251B, the switch terminals 252A and 252B, and the ground terminals 253A and 253B in FIG. 8, hence including the first and second feedback input terminals.

When the DC/DC converter 10 in FIG. 1 is formed by the multi-phase/single-phase switching semiconductor device 500, the semiconductor device 500 operates in a multi-phase mode, and provides the feedback voltage $V_{FB}$ to the first feedback input terminal. In the multi-phase mode operation, in the semiconductor device 500, the nodes 115, 124A and 124B are connected to the first feedback input terminal.

When the DC/DC converter 20 in FIG. 8 is formed by the multi-phase/single-phase switching semiconductor device 500, the semiconductor device 500 operates in a single-phase mode, and provides the feedback voltages $V_{FB1}$ and $V_{FB2}$ to the first and second feedback input terminals. In the single-phase mode operation, in the semiconductor device 500, the nodes 115A and 124A in FIG. 8 are connected to the first feedback input terminal, and the nodes 115B and 124B in FIG. 8 are connected to the second feedback input terminal.

Moreover, after the DC/DC converter 10 or 20 using the multi-phase/single-phase switching semiconductor device 500 is activated, the operation mode may be switched between a multi-phase mode and a single-phase mode. In this case, even in the existence of switching from a single-phase mode to a multi-phase mode, the switch phase difference of the first and second phases may also be ensured by means of the method of the first embodiment.

Moreover, in the semiconductor device 500, the resistors 112 and 113 or the resistors 112A and 113A may be externally connected to the semiconductor device 500 by being provided outside the semiconductor device 500; alternatively, the output-stage circuits 180A and 180B may be externally connected to the semiconductor device 500 by being provided outside the semiconductor device 500.

Fourth Embodiment

The fourth embodiment of the disclosure is described below. The DC/DC converter 10 may be used as a power supply device for any electronic machine. The DC/DC converter 10 is particularly suitable for, for example, purposes demanding high load response performance in response to a large load variance and strongly requiring miniaturization. The DC/DC converter 10 of this embodiment may also be a DC/DC converter 10 formed by the semiconductor device 500.

For example, the DC/DC converter 10 may serve as a power supply device for a solid-state drive (SSD). An SSD is a recording device having a semiconductor memory as a recording medium, and includes main components such as the semiconductor memory and a memory controller controlling reading/writing data from/to the semiconductor memory. Various changes may occur in the power consumption of the memory controller. That is to say, when the memory controller is used as a load (equivalent to the load LD in FIG. 1) of a power supply device, the load variance is large. High load response performance may be achieved by using the output voltage $V_{OUT}$ of the DC/DC converter 10 as a power supply voltage for such memory controller.

In addition, small coils may be used as the coils L1 and L2 (referring to FIG. 1) by means of multi-phase driving, and so the overall size of the SSD may be reduced. In order to miniaturize the SSD, low-profile components (components with small heights) need to be used. However, the direct-current resistance (DCR) of a low-profile coil can easily be increased. When one low-profile coil is used for single-phase driving and a large current (a large current needed by the memory controller, for example, 12A) flows in the coil such that heating becomes obvious, power supply efficiency is noticeably reduced. If multi-phase driving is adopted as the DC/DC converter 10, the load current may be shared by multiple coils, and so low-profile components may be used without incurring any issues.

When an SSD is used as a recording device of a server device in such as a data sensor, power supply efficiency is extremely important from perspectives of persistent operation (24-hour operation), and high power supply efficiency may be achieved by means of introducing the current balance technique. The DC/DC converter 10 may also be used in an SSD mounted in such as a personal computer.

Fifth Embodiment

The fifth embodiment of the disclosure is described below. In the first embodiment, an example of a step-down multi-phase DC/DC converter is used to describe the DC/DC converter 10 having circuits of two phase components; however, a step-down multi-phase DC/DC converter having circuits of n phase components may also be formed. Herein, n is any integer equal to or more than 2.

Considering n=3, a step-down multi-phase DC/DC converter having circuits of three phase components, that is, a step-down three-phase DC/DC converter, is described. FIG. 10 brief depicts a part of the structure of the step-down three-phase DC/DC converter. The step-down three-phase DC/DC converter includes the components of the DC/DC converter 10 in FIG. 1, and further includes a pulse generator 120C, a TON setting portion 150C, an output-stage driving portion 170C, an output-stage circuit 180C, a current sensor 190C, a protection circuit 200C and a coil L3 as a pulse generator, a TON setting portion, an output-stage driving portion, an output-stage circuit, a current sensor, a protection circuit and a coil of the third phase (in which the current sensor 190C and the protection circuit 200C are not shown). The structures and operations of the circuits of the third phase are the same as the structures and operations of the circuits of the first phase or the second phase. The structures and operations of the circuits of the third phase are described below, and the structure and operation of the step-down three-phase DC/DC converter are also described at the same time.

The output-stage circuit 180C has a structure the same as that of the output-stage circuit 180A, and includes an output transistor 181C and a synchronous rectifier transistor 182C corresponding to the output transistor 181A and the synchronous rectifier transistor 182A. The output-stage circuit 180C generates a switch voltage $V_{LX3}$ in rectangular waves at a switch terminal 252C equivalent to a connecting node between the output transistor 181C and the synchronous rectifier transistor 182C through switching the input voltage $V_{IN}$. The coil L3 is disposed between the switch terminal 252C and the output terminal 254. Moreover, similar to the DC/DC converter, in the step-down three-phase DC/DC converter, the coil L1 is disposed between the switch terminal 252A generating the switch voltage $L_{VX1}$ and the output terminal 254, and the coil L2 is disposed between the switch terminal 252B generating the switch voltage $L_{VX2}$ and the output terminal 254.

The pulse generator 120C has a structure the same as that of the pulse generator 120A, and generates a feedback pulsating voltage $V_{FBIN3}$ variant with the switch voltage $V_{LX3}$ on the basis of the feedback voltage $V_{FB}$.

In the step-down three-phase DC/DC converter, the PWM comparator 130 uses an average voltage of the feedback pulsating voltages $V_{FBIN1}$, $V_{FBIN2}$ and $V_{FBIN3}$, but not the average voltage of the feedback pulsating voltages $V_{FBIN1}$ and $V_{FBIN2}$, as the voltage $V_{FBIN\_AVE}$, and generates the signal COMP by means of the operation in the first embodiment. Each rising edge timing of the signal COMP represents the turn-on timing of any transistor of the output transistors 181A, 181B and 181C.

Figure 11:
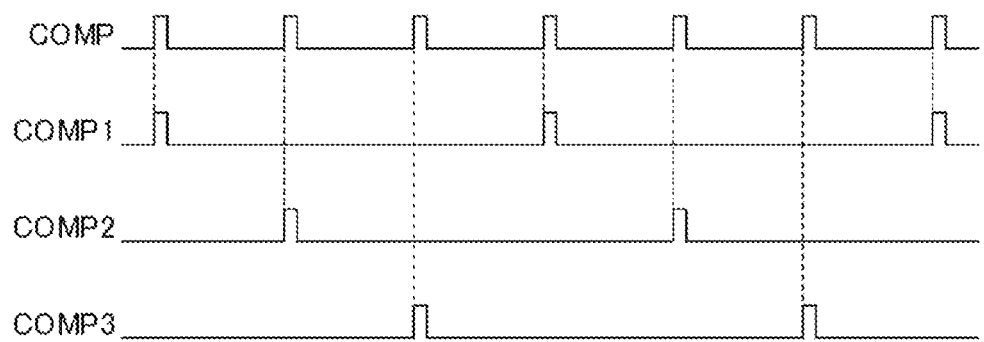
FIG. 11 is a waveform diagram of some signals of the step-down three-phase DC/DC converter in FIG. 10.

In the step-down three-phase DC/DC converter, the phase control logic 140, as shown in FIG. 11, generates the signals COMP1, COMP2 and COMP3 by sequentially and repeatedly allocating multiple pulses representing multiple turn-on timings included in the signal COMP to the signals COMP1, COMP2 and COMP3. To be even more specific, the operation below is performed. That is, in the step-down three-phase DC/DC converter, the phase control logic 140 in principle keeps the levels of the signals COMP1 to COMP3 to the low level; when the signal COMP generates the $(3xi+1)^{th}$ rising edge, the signal COMP1 also generates a rising edge in synchronization with the rising edge of the signal COMP, and returns to the low level after the signal COMP1 is set to the high level by a specific minute time; when the signal COMP generates the $(3xi+2)^{th}$ rising edge, the signal COMP2 also generates a rising edge in synchronization with the rising edge of the signal COMP, and returns to the low level after the signal COMP2 is set to the high level by a specific minute time; when the signal COMP generates the $(3xi)^{th}$ rising edge, the signal COMP3 also generates a rising edge in synchronization with the rising edge of the signal COMP, and returns to the low level after the signal COMP3 is set to the high level by a specific minute time (i is an integer herein).

The TON setting portions 150A, 150B and 150C generate the driving control signals DRV1, DRV2 and DRV3 according to the signals COMP1, COMP2 and COMP3, respectively. The method of generating the driving control signal according to the signal COMP3 is the same as the method of generating the driving control signal DRV1 according to the signal COMP1.

The operation of the PLL circuit 160 is as described above. However, in the step-down three-phase DC/DC converter in FIG. 10, the output signal $S_{PLL}$ of the PLL circuit 160 is provided to not only the TON setting portions 150A and 150B but also to the TON setting portion 150C, and accordingly the frequencies of the driving control signals DRV1, DRV2 and DRV3 (hence the switch frequencies of the output transistors 181A, 181B and 181C) match or approximate the reference frequency $f_{CLK}$.

The output-stage driving portions 170A, 170B and 170C switch-drive the output-stage circuits 180A, 180B and 180C according to the driving control signals DRV1, DRV2 and DRV3. Similar to the output-stage driving portions 170A and 170B, the output-stage driving portion 170C sets the output-stage circuit 180C to an outputting high level state in the high-level period of the driving control signal DRV3, and sets the output-stage circuit 180C to the outputting low level state in a low-level period of the driving control signal DRV3.

Hence, because "360°/n=360°/3=120°", the output-stage circuits 180A to 180C are switch-driven by a phase difference of 120° (or a phase difference approximating 120°), and ideal three-phase driving is achieved by a control method similar to the constant on-time control method.

The current balance signal generator 210 generates current balance signals $S_{CB1}$, SCB2 and SCB3 according to first, second and third target currents detected by the current sensors 190A, 190B and 190C (the current sensors are not shown in FIG. 10). The first, second and third target currents are currents respectively flowing through the switch terminals 252A, 252B and 252C, and are equivalent to coils currents $I_{L1}$, $I_{L2}$ and $I_{L3}$. Moreover, the coil current $I_{L3}$ represents a current flowing in the coil L3. The TON setting portions 150A, 150B and 150C correct the on-times $T_{ON1}$, $T_{ON2}$ and $T_{ON3}$ (lengths of high-level periods of the driving control signals DRV1, DRV2 and DRV3) depending on requirements according to the current balance signals $S_{CB1}$, $S_{CB2}$ and $S_{CB3}$, accordingly reducing a difference between the first to third target currents. The reducing method is the same as the method described in the first embodiment (the reducing method expressed when "n=2" in the first embodiment). Moreover, the on-time $T_{ON3}$ represents the period in which the output-stage circuit 180C is in the outputting high level state in each cycle of the switching of the output-stage circuit 180C (that is, the period in which the output transistor 181C is on).

Sixth Embodiment

The sixth embodiment of the disclosure is described below. In this sixth embodiment, a variation technique or application technique applicable to the first to fifth embodiment is described.

A synchronous rectification method is used for the output-stage circuit in the DC/DC converter (for example, the DC/DC converter 10 in FIG. 1) in each of the embodiments; however, a diode rectification method may also be used. That is to say, a rectifier diode is substituted for each synchronous rectifier transistor. To carry out the substitution, the transistor under on/off control in each output-stage circuit is only an output transistor.

A DC/DC converter that applies a phase difference ensuring technique and a current balance technique is described; however, in the step-down multi-phase DC/DC converter of the disclosure, only the phase difference ensuring technique or only the current balance technique may be installed.

For any signal or voltage, the relationship between the high level and the low level may be opposite to the relationship described, provided that the form of the subject is not compromised.

For the FETs in the various embodiments, the types of channels are only exemplary, and the N-channel FET may be modified to the P-channel FET, or the P-channel FET may be modified to the N-channel FET, so as to modify the circuit structure including the FET. For example, the output transistors 181A and 181B in FIG. 1 may be replaced by a variation of P-channel MOSFETs.

Given that no issues are incurred, any transistor may also be any type of transistor. For example, given that no issues are incurred, any transistor implemented by a MOSFET may be replaced by a junction FET, an insulated gate bipolar transistor (IGBT) or a bipolar transistor. Any transistor includes a first electrode, a second electrode and a third electrode. In an FET, one between the first and second electrodes is the drain and the other is the source, and the control electrode is the gate. In an IGBT, one between the first and second electrodes is the collector and the other is the emitter, and the control electrode is the gate. For a bipolar transistor that is not an IGBT, one between the first and second electrodes is the collector and the other is the emitter, and the control electrode is the base.

<<Investigation of the Disclosure>>

Figure 12:
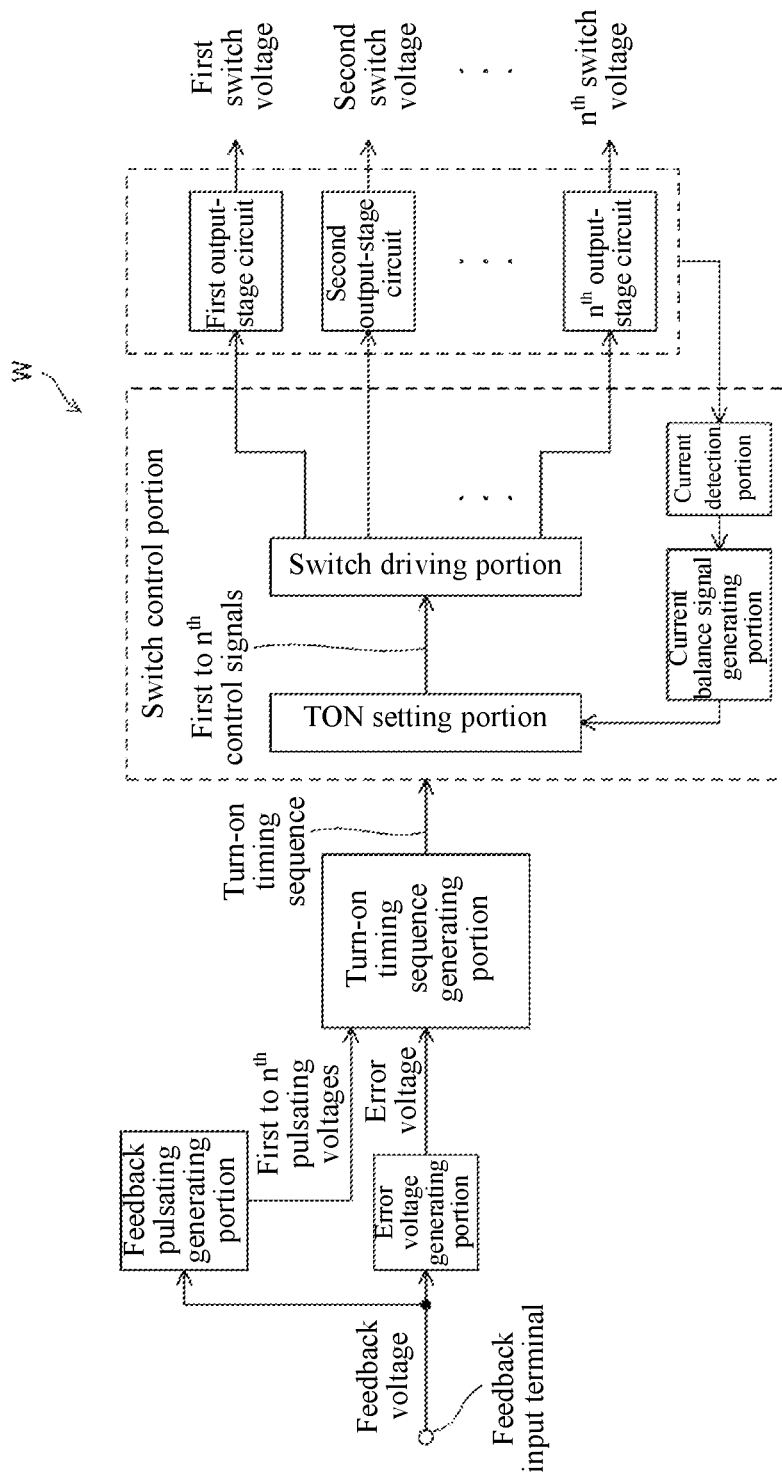
FIG. 12 is a block diagram of a semiconductor device according to an embodiment of the disclosure.

Specific configuration examples of the embodiments of the disclosure are described below. FIG. 12 shows a block diagram of a semiconductor device W according to an embodiment of the disclosure.

The semiconductor device W (for example, corresponding to the semiconductor device 500 in FIG. 9) according to an embodiment of the disclosure is a semiconductor device of a step-down multi-phase DC/DC converter for stepping down an input voltage and generating an output voltage, includes: first to $n^{th}$ output-stage circuits (where n is an integer equal to or more than 2), switching the input voltage such that first to $n^{th}$ switch terminals generate first to $n^{th}$ switch voltages (for example, $V_{LX1}$ and $V_{LX2}$) in rectangular waves; and a switch control portion, switch-driving the first to $n^{th}$ output-stage circuits in a state where switch-driving of the first to $n^{th}$ output-stage circuits is provided with a phase difference. Moreover, in the step-down multi-phase DC/DC converter, the output voltage is generated by means of rectifying and smoothing the first to $n^{th}$ switch voltages; the semiconductor device includes: a feedback input terminal, receiving a feedback voltage (for example, $V_{FB}$) corresponding to the output voltage; an error voltage generator, generating an error voltage (for example, $V_{ERR}$), the error voltage corresponding to a difference between a voltage proportional to the feedback voltage and a predetermined reference voltage; a feedback pulsating voltage generator, generating first to $n^{th}$ feedback pulsating voltages (for example, $V_{FBIN1}$ and $V_{FBIN2}$) variant with the first to $n^{th}$ switch voltages by using the feedback voltage as a reference; and a turn-on timing sequence generator, generating a turn-on timing sequence including multiple turn-in timings according to the error voltage and the first to $n^{th}$ feedback pulsating voltages, in which the switch control portion sequentially switch-drives the first to $n^{th}$ output-stage circuits according to the turn-on timing sequence to set a phase difference for the switch-driving of the first to $n^{th}$ output-stage circuits.

The correspondence of the semiconductor device W and the structure in FIG. 1 is appropriately described below (the same may be considered for the correspondence with the structure in FIG. 10). The first to $n^{th}$ output-stage circuits of the semiconductor device W correspond to the output-stage circuits 180A and 180B in FIG. 1. The switch control portion of the semiconductor device W corresponds to the blocks referenced by numerals 140, 150A, 150B, 160, 170A, 170B, 190A, 190B, 200A, 200B and 210 in FIG. 1. The feedback input terminal of the semiconductor device W corresponds to the node 115 (124A and 124B) in FIG. 1. The error voltage generator of the semiconductor device W corresponds to the error voltage generator 110 in FIG. 1. The feedback pulse generator of the semiconductor device W is formed by the pulse generators 120A and 120B in FIG. 1. The turn-on timing sequence generator of the semiconductor device W corresponds to the PWM comparator 130 in FIG. 1. Since the output signal COMP of the PWM comparator 130 specifies the turn-on timing sequence, it may be explained that the PWM comparator 130 generates the turn-on timing sequence.

In the semiconductor device W, for example, the first to $n^{th}$ output-stage circuits include the first to $n^{th}$ output transistors (181A and 181B) disposed between the application terminal of the input voltage and the first to $n^{th}$ switch terminals, the switch control portion includes an on-time setting portion setting the turn-on times (for example, $T_{ON1}$ and $T_{ON2}$) of the output transistors, and switch-drives the first to $n^{th}$ output-stage circuits according to the setting configuration and the turn-on timing sequence.

The on-time setting portion of the semiconductor device W is formed by the TON setting portions 150A and 150B in FIG. 1. The PLL circuit 160 in FIG. 1 may be explained as being included in the constituting component of the on-time setting portion, or may be explained as being disposed separately from the on-time setting portion in the switch control portion.

For example, in the semiconductor device W, the turn-on timing sequence generator sets the turn-on timing at a moment whenever a high-low relationship between the error voltage and an average voltage (for example, $V_{FBIN\_AVE}$) of the first to $n^{th}$ feedback pulsating voltages changes from a first relationship to a second relationship, and generates the turn-on timing sequence accordingly; and the switch control portion repeats an operation of sequentially turning on the first to $n^{th}$ output transistors at n consecutive turn-on timings included in the turn-on timing sequence.

In the structure in FIG. 1, the change from the first relationship to the second relationship corresponds to the change from "$V_{FBIN\_AVE} > V_{ERR}$" to "$V_{FBIN\_AVE} < V_{ERR}$", or the change from the first relationship to the second relationship may also correspond to the change from "$V_{FBIN\_AVE} < V_{ERR}$" to "$V_{FBIN\_AVE} > V_{ERR}$", such that the structure and operation of the circuit in FIG. 1 change accordingly. In the structure in FIG. 1, since "n=2", the output transistors 181A and 181B are sequentially turned on at two consecutive turn-on timings (that is, two consecutive rising edge timings of the signal COMP) included in the turn-on timing sequence, and the output transistors 181A and 182B are again sequentially turned on in the next two consecutive turn-on timings. The same operation below is repeated. The same applies when "n≥3".

For another example, in the semiconductor device W, the on-time setting portion generates first to $n^{th}$ driving control signals (for example, DRV1 and DRV2) specifying an on-period and an off-period of the first to $n^{th}$ output transistors according to the setting configuration of the on-time of each of the output transistors and the turn-on timing sequence, the switch control portion includes a switching driving portion that turns on/off the first to $n^{th}$ output transistors according to the first to $n^{th}$ driving control signals, and the on-time setting portion sets, using a PLL circuit, the on-time of each of the output transistors such that a frequency of the first to $n^{th}$ driving control signals corresponding to a switching frequency of the first to $n^{th}$ output transistors matches or approximates a predetermined reference frequency.

The switch-driving portion of the semiconductor device W is formed by the output-stage driving portions 170A and 170B in FIG. 1.

For another example, in the semiconductor device W, the switch control portion includes: a current detection portion, detecting first to $n^{th}$ target currents flowing through the first to $n^{th}$ switch terminals; and a current balance signal generator, generating a current balance signal (for example, $S_{CB1}$ and $S_{CB2}$) corresponding to a magnitude relationship of the first to $n^{th}$ target currents according to a detection result of the current detection portion, in which the on-time setting portion adjusts the on-time of each of the output transistors according to the current balance signal to reduce a difference between the first to $n^{th}$ target currents.

The current detecting portion of the semiconductor device W is formed by the current sensors 190A and 190B in FIG. 1. The current balance signal generator of the semiconductor device W corresponds to the current balance signal generator 210 in FIG. 1.

Various modifications may be made to the embodiments of the disclosure with the scope of the technical concept of the claims. The embodiments above are only examples of possible implementations of the disclosure, and the meanings of the terms of the disclosure or the constituting components are not limited to the meanings of the terms in used in the embodiments above. The specific numerical values used in the description are only examples, and these numerical values may be changed to various other numeral values.

What is claimed is:

1. A semiconductor device, applicable to a step-down multi-phase direct-current (DC)/DC converter for stepping down an input voltage and generating an output voltage based on a plurality of switch voltages, the semiconductor device comprising:
- a plurality of output-stage circuits, operable to generate the plurality of switch voltages by a plurality of switch terminals by switching the input voltage;
- an error voltage generator, operable to generate an error voltage, the error voltage corresponding to a difference between a voltage proportional to a feedback voltage of the output voltage and a predetermined reference voltage;
- a feedback pulsating voltage generator, operable to generate a plurality of feedback pulsating voltages variant with the plurality of switch voltages by using the feedback voltage as a reference;
- an on timing sequence generator, operable to generate an on timing sequence comprising a plurality of on timings according to the error voltage and the plurality of feedback pulsating voltages; and
- a switch control portion, operable to sequentially switch-drive the plurality of output-stage circuits according to the on timing sequence to assign a phase difference to the switch-driving of the plurality of output-stage circuits,
- wherein the on timing sequence generator is operable to generate the on timing sequence by setting a moment as the on timing when a high-low relationship between the error voltage and an average voltage of the plurality of feedback pulsating voltages changes from a first relationship to a second relationship.

2. The semiconductor device according to claim 1, wherein
- a plurality of output transistors are included in the plurality of output-stage circuits, whereby an output transistor is arranged between an application terminal of the input voltage and a corresponding switch terminal in each of the output-stage circuits, and
- the switch control portion comprises an on-time setting portion that sets an on time of each of the output transistors, and switch-drives the plurality of output-stage circuits according to a setting configuration and the on timing sequence.

3. The semiconductor device according to claim 2, wherein
the switch control portion repeats an operation of sequentially turning on the plurality of output transistors at the plurality of consecutive on timings included in the on timing sequence.

4. The semiconductor device according to claim 2, wherein
- the on-time setting portion is operable to generate a plurality of driving control signals specifying an on-period and an off-period of the plurality of output transistors according to the setting configuration of the on time of each of the output transistors and the on timing sequence,
- the switch control portion comprises a switching driving portion that is operable to turn on/off the plurality of output transistors according to the plurality of driving control signals, and
- the on-time setting portion is operable to use a phase-locked loop (PLL) circuit to set the on time of each of the output transistors such that a frequency of the plurality of driving control signals corresponding to a switching frequency of the plurality of output transistors matches or approximates a predetermined reference frequency.

5. The semiconductor device according to claim 2, wherein the switch control portion comprises:
- a current detection portion, operable to detect a plurality of target currents flowing through the plurality of switch terminals; and
- a current balance signal generator, operable to generate a current balance signal corresponding to a magnitude relationship of the plurality of target currents according to a detection result of the current detection portion, wherein
- the on-time setting portion is operable to adjust the on time of each of the output transistors according to the current balance signal to reduce a difference between the plurality of target currents.

6. The semiconductor device according to claim 5, wherein
- the plurality of target currents comprise a first target current and a second target current, the plurality of output transistors comprise a first output transistor connected to a first switch terminal of the plurality of switch terminals at which the first target current flows and a second output transistor connected to a second switch terminal of the plurality of switch terminals at which the second target current flows, wherein
- the on-time setting portion is operable to decrease and correct the on time of the first output transistor according to the current balance signal, and operable to increase and correct the on time of the second output transistor when the first target current is greater than the second target current,
- the on-time setting portion is operable to increase and correct the on time of the first output transistor according to the current balance signal, and operable to decrease and correct the on time of the second output transistor when the first target current is less than the second target current.

7. A step-down multi-phase direct-current-to-direct-current (DC)/DC converter, comprising:
- the semiconductor device according to claim 1;
- a plurality of coils between an output terminal to which the output voltage is applied and the plurality of switch terminals; and
- an output capacitor between the output terminal and a ground, wherein the output voltage is operable to be generated at the output terminal by rectifying and smoothing the plurality of switch voltages by using the plurality of coils and the output capacitor.

8. A semiconductor device, applicable to a step-down multi-phase direct-current (DC)/DC converter for stepping down an input voltage and generating an output voltage based on a plurality of switch voltages, the semiconductor device comprising:
- a plurality of output-stage circuits, operable to generate the plurality of switch voltages by a plurality of switch terminals by switching the input voltage;
- a feedback pulsating voltage generator, operable to receive a feedback voltage proportional to the output voltage as a reference and generate a plurality of feedback pulsating voltages variant with the plurality of switch voltages; and
- a switch control portion, operable to switch-drive the plurality of output-stage circuits in a state when switch-driving of the plurality of output-stage circuits are provided with a phase difference,
- wherein a plurality of output transistors are included in the plurality of output-stage circuits, whereby an output transistor is arranged between an application terminal of the input voltage and a corresponding one of the switch terminals in each of the output-stage circuits, the switch control portion comprising:
- an on-time setting portion, operable to set an on time of each of the output transistors based on the plurality of feedback pulsating voltages;
- a current detection portion, operable to detect a plurality of target currents flowing through the plurality of switch terminals; and
- a current balance signal generator, operable to generate a current balance signal corresponding to a magnitude relationship of the plurality of target currents according to a detection result of the current detection portion,
- wherein the on-time setting portion is operable to adjust the on time of each of the output transistors according to the current balance signal to reduce a difference between the plurality of target currents, the semiconductor device further comprising an on timing sequence generator operable to generate an on timing sequence according to the plurality of feedback pulsating voltages by setting a moment as the on time when a high-low relationship between an error voltage and an average voltage of the plurality of feedback pulsating voltages changes from a first relationship to a second relationship.

9. The semiconductor device according to claim 8, wherein the plurality of target currents comprise a first target current and a second target current, the plurality of output transistors comprise a first output transistor connected to a first switch terminal of the plurality of switch terminals at which the first target current is operable to flow and a second output transistor connected to a second switch terminal of the plurality of switch terminals at which the second target current is operable to flow, wherein the on-time setting portion is operable to decrease and correct the on time of the first output transistor according to the current balance signal and increases and corrects the on time of the second output transistor when the first target current is greater than the second target current, the on-time setting portion is operable to increase and correct the on time of the first output transistor according to the current balance signal, and operable to decrease and correct the on time of the second output transistor when the first target current is less than the second target current.

* * * * *